US00RE37812E

(19) United States
(12) Reissued Patent
Ishikura et al.

(10) Patent Number: US RE37,812 E
(45) Date of Reissued Patent: Aug. 6, 2002

(54) MAGNIFICATION SETTING APPARATUS FOR IMAGE FORMING APPARATUS

(75) Inventors: Kaoru Ishikura, Yamatokoriyama; Yuji Okamoto, Kyoto, both of (JP)

(73) Assignee: Sharp Kabushiki Kaisha, Osaka (JP)

(21) Appl. No.: 09/632,811

(22) Filed: Aug. 4, 2000

Related U.S. Patent Documents

Reissue of:
(64) Patent No.: 5,790,921
Issued: Aug. 4, 1998
Appl. No.: 08/808,566
Filed: Feb. 28, 1997

(30) Foreign Application Priority Data

Mar. 4, 1996 (JP) ..... 8-045916

(51) Int. Cl.[7] ..... G03G 15/04; G03G 21/00
(52) U.S. Cl. ..... 399/86; 399/196
(58) Field of Search ..... 399/86, 81, 85, 399/196, 197; 355/55

(56) References Cited

U.S. PATENT DOCUMENTS

| | | | | |
|---|---|---|---|---|
| 4,763,174 A | | 8/1988 | Makiura et al. | 355/55 |
| 4,891,670 A | * | 1/1990 | Kanbayashi | 399/86 |
| 5,008,709 A | | 4/1991 | Shinada et al. | 399/86 |
| 5,287,159 A | * | 2/1994 | Sakakibara | 399/86 |

FOREIGN PATENT DOCUMENTS

| | | | |
|---|---|---|---|
| GB | 2111696 A | | 7/1983 |
| JP | 59023335 A | | 2/1984 |
| JP | 59033441 A | | 2/1984 |
| JP | 59090867 | | 5/1984 |
| JP | 60-207159 | * | 10/1985 |
| JP | 61130938 A | | 6/1986 |
| JP | 1003676 | | 1/1989 |
| JP | 4-3547 | * | 1/1992 |
| JP | 4138474 | | 5/1992 |
| JP | 5127472 | | 5/1993 |
| JP | 5188705 | | 7/1993 |
| JP | 5333657 A | | 12/1993 |
| JP | 8006442 | | 1/1996 |
| JP | 8030151 | | 2/1996 |

* cited by examiner

*Primary Examiner*—Sophia S. Chen

(57) ABSTRACT

When zoom keys for changing a magnification by a predetermined unit each time, not only setting of a fixed magnification is bothersome, but also setting a magnification in the vicinity of the fixed magnification is very troublesome. A zoom up key and a zoom down key for changing a magnification by a predetermined unit, e.g., 1%, each time to set to a desired magnification are provided. By operating either one of the keys, a set magnification is zoomed up or down, while displaying that condition in an LCD display which serves as a display portion. While the set magnification shifts, when the set magnification becomes a fixed magnification or a magnification close to the same, a sub message as well is displayed which indicates an optimal combination of original and paper sizes with which processing at that fixed magnification is possible. Referring to the displayed sub message, the desired magnification is set by operating the zoom up key or the zoom down key.

18 Claims, 21 Drawing Sheets

FIG. 6

| (FIXED MAGNIFICATION) | (SUB MESSAGE) | | |
|---|---|---|---|
| 1.15× | B5→A4<br>B4→A3 | 0.86× | A4→B5<br>A3→B4 |
| 1.22× | A5→B5<br>A4→B4 | 0.81× | B5→A5<br>B4→A4 |
| 1.41× | A5→A4<br>A4→A3<br>B5→B4 | 0.70× | A3→A5<br>A3→A4<br>B4→B5 |

MAGNIFICATION SETTING APPARATUS FOR IMAGE FORMING APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to setting of an optional magnification of image formation in an image forming process which is performed by an image forming apparatus.

2. Description of the Related Art

In an image forming apparatus, especially in a copying machine, a laser printer and the like which utilize electrophotographic method, a photosensitive material which is a recording medium is uniformly electrified so that after uniform electrification, reflected light from an original or laser light which is driven in accordance with image information irradiates and forms an electrostatic image corresponding to the image on a surface of the photosensitive material, and a developing agent is used to develop the electrostatic image and obtain a visible image. The developed image is transferred onto a sheet of paper which is transported appropriately and the sheet of paper is fed into a fixing apparatus so that a toner image transferred onto the sheet of paper is fixed as a permanent image and thereafter outputted outside.

After electrifying the photosensitive material to a predetermined polarity, an image is exposed on the surface of the photosensitive material at an optional magnification which is preliminarily set. That is, where the magnification is equivalent, the image as it is exposed, i.e., exposure is performed under a condition of 1:1, whereas for image reduction, an optical image having the size less than 1 against the image having the size 1 is exposed and focused.

For example, in a copying machine, a reflected optical image from an original is focused, as it is reduced or enlarged, on a photosensitive material through an imaging lens or the like. Meanwhile, in a digital image forming apparatus such as a laser printer, the size of a laser beam is not controlled in accordance with a ratio of enlargement. Rather, the number of pixels of an image is controlled. For instance, the number of pixels is reduced in accordance with the magnification of reduction of the image, and the number of pixels is increased for enlargement of the image.

Conventionally, in the case where the size of an original and the size of a paper to be used are fixed sizes, it is possible to form an image in accordance with a preset magnification. For example, where the original sizes are A3, A4, B4 and B5 of the Japanese Industrial Standards and the paper sizes are A4, A5, B4 and B5, the image is exposed on a surface of a photosensitive material at a magnification of 1.22× (122%) when the original size is A4 and the paper size of a paper on which an image is to be formed is B4, and the image is exposed on the surface of the photosensitive material at a magnification of 0.86× (86%) when the paper size is B5.

In the case where the original size is B4 and the paper size of a paper to be used is A4 or B5, the image is exposed at a magnification of 0.81× (81%) or 0.70× (70%). In the case where the original size is B5 and the paper size of a paper to be used is A4 or B4, the image is exposed at a magnification of 1.15× (115%) or 1.41× (141%).

As described above, when an original of a fixed size and a paper of a fixed size are used, image exposure is performed at a predetermined magnification so that all images contained in the original are formed on the paper. Such a predetermined magnification is called a fixed magnification. To prefer an image at a fixed magnification, a setting key for selecting only the fixed magnification (i.e., a fixed magnification key) is provided. With respect to a fixed magnification key, there are several cases such as a case where fixed magnification keys as many as magnifications described above are provided, a case where with only one setting key, one can set a fixed magnification cyclically in an order of 70%→81%→86%→(100%; sometimes omitted) →115%→122%→141%→70%, a case where one setting key is provided to set a fixed magnification in a direction for enlargement (70%→81% . . . 141%) and another setting key is provided to set a fixed magnification in a direction for reduction (141%→122% . . . 70%).

Separately from this, a zoom key or the like is provided with which it is possible to change a magnification by 1%. In short, this key is used to set an optional magnification which is preferred by a user, not to set fixed magnifications described above. For instance, when the original size is A4 and the paper size of a paper on which an image is to be formed is B5, while there is no problem for forming an image at a fixed magnification of 86%, the zoom key is used to form an image at a little smaller magnification (e.g., 83%).

In a conventional magnification setting apparatus described above, there are a key for setting a fixed magnification and a zoom key for freely setting an optional magnification. Therefore, by manipulating these keys, an image can be formed at a desired magnification.

However, during setting of a magnification described above, although a skilled operator is capable of easily manipulating, an unskilled operator can not very often understand at all what a fixed magnification is. That is, even though an unskilled operator can understand that the original size is B4, he can not understand at all whether to set a magnification by manipulating a fixed magnification key or by manipulating a zoom key for the purpose of form an image on an A4 paper. In addition, where a fixed magnification is to be set by means of a zoom key, an unskilled operator does not know the fixed magnification to be set, often ending up in setting a wrong magnification. To avoid this, an unskilled operator must to refer to a comparison chart while setting a magnification, which is very bothersome.

Further, provision of a fixed magnification key and a zoom key separately from each other as described above simply increases the number of setting keys to be used by an operator so that it is very hard for the operator to understand which key to manipulate to easily set a desired magnification, which forces the operator a bothersome operation. In addition, since the operator must set a magnification while looking at the comparison chart described above, without the comparison chart, the operator may rely on his own intuition when setting a wrong magnification and end up in making an undesired copy.

Except for a fixed magnification key and a zoom key, as described in Japanese Patent Application Laid-Open Gazette No. 4-3547, often-used magnifications may be stored in advance and setting keys for setting such magnifications may be provided separately from zoom key and the fixed magnification key. Where such setting keys are provided, the magnifications which are very often used can be set by an easy manipulation. However, a user must store such magnifications in advance, and therefore, an inexperienced user feels awkward toward the increased number of the setting keys and finds setting of a magnification very pressurizing.

To deal with this, for the purpose of setting fixed magnifications, setting keys may be provided for the respective fixed magnifications as described in Japanese Patent Application Laid-Open Gazette No. 4-3547, and printing may be realized on fixed sizes which correspond to the respective setting keys. For instance, for a fixed magnification key choosing 70%, an optimal paper size is displayed which is optimum for forming an image which corresponds to the original size, such as B4→B5, A3→A4.

However, in the case where there are a number of keys, such as keys corresponding to respective fixed magnification keys, a zoom key, and a special fixed magnification key as described above, provided for providing such a display described above, due to a restriction to a space on an operation panel for providing a number of keys, printing or displaying with very small letters can not avoided in reality. Such a display is very hard to look at, making reference to the display very rare. Further, when combinations of optimal conditions for all originals and all paper sizes corresponding to respective fixed magnifications are displayed, together with a problem that a small display is forced as described above, searching of a proper condition requires a bothersome operation. In addition, arrangement of a number of keys, such as a zoom key, fixed magnification keys and magnification memory keys for often-used magnifications, on an operation gives a stronger impression to a user, and the user tends to feel that an operation is bothersome.

Further, in the case where a fixed magnification is to be or a magnification which is close to the fixed magnification is to be set by means of a zoom key, although an operator is very familiar with the very magnification as described above, when the operator is inexperienced, the operator can not easily understand a magnification to be set and setting is very difficult for the operator.

SUMMARY OF THE INVENTION

To solve the problems described above, a first object of the invention is to simplify an operation for setting a magnification. A further object of the invention is to provide for a magnification setting apparatus which allows setting of not only a fixed magnification but also an optional magnification by means of a key for setting a magnification.

In particular, an object of the invention is to improve the operability of a zoom key so that when the zoom key is used to set a magnification, use of the zoom key makes it easy to set a fixed magnification and an optional magnification.

To achieve the objects, the invention provides a magnification setting apparatus for use in an image forming apparatus in which a plurality of fixed magnifications at which a plurality of predetermined image sizes are enlarged or reduced into a plurality of sizes of recording mediums are predetermined and which forms an image on a recording medium at the predetermined magnifications, the magnification setting apparatus comprising: a zoom key for setting a magnification by shifting by a predetermined unit; a magnification counter for serially counting the magnification in accordance with an operation of the zoom key; a display portion for displaying a count content of the magnification counter; judging means for judging whether the count content of the magnification counter corresponds to a predetermined fixed magnification; and display control means for displaying, together with the magnification, a sub message which indicates combinations of paper sizes and the like which correspond to the fixed magnification, when the judging means judges that the magnification shown by the magnification counter corresponds to one fixed magnification.

Particularly when the judging means is structured to judge a time when the content of the magnification counter reaches a value which is close to one fixed magnification, while the magnification is shifted by the predetermined unit, e.g., 1% at a time by means of the zoom key, when the content becomes close to one fixed magnification, a sub message is displayed which indicates a combination of a paper size and the like which are specified corresponding to the fixed magnification. Referring to this display, an operator easily confirms the fixed magnification at which an image can be formed in a predetermined paper size, which simplifies the operation for setting the magnification which is one object. That is, setting of a fixed magnification is made easy even while the zoom key is operated. The object to make setting of a fixed magnification easy is also achieved, with respect to setting of an optional magnification.

Alternatively, in order to achieve the objects, the invention provides a magnification setting apparatus of an image forming apparatus in which a plurality of fixed magnifications at which a plurality of predetermined image sizes are enlarged or reduced into a plurality of sizes of recording mediums are predetermined and which forms an image on a recording medium at the predetermined magnifications, the magnification setting apparatus comprising: a zoom key for setting a magnification by shifting by a predetermined unit; a magnification counter for serially counting the magnification in accordance with an operation of the zoom key; a display portion for displaying a count content of the magnification counter; and display control means for displaying sub messages which indicates combinations of fixed magnifications and paper sizes or the like corresponding to the fixed magnifications at once together with the magnification, when the zoom key is operated.

In this case, the display control means judges in which one of a magnification zooming up direction and a magnification zooming down direction the zoom key is operated, selects from various predetermined fixed magnifications in the zooming up direction or the zooming down direction, and displays altogether. Since sub messages indicating the various fixed magnifications and the corresponding specified paper sizes are displayed at once, an operator can even surely recognize a fixed magnification which corresponds to a desired paper size, whereby the object of simplify an operation for setting a magnification is achieved.

After the display control means confirms that the magnification which is set by operating the zoom key exceeds a fixed magnification, by deleting a display of the exceeded fixed magnification, it is possible to even more surely and easily recognize a desired magnification as the unnecessary display is deleted. Alternatively, by displaying fixed magnifications to which a magnification set by operating the zoom key will be sequentially set and the remaining other fixed magnifications distinguishably from each other, relationship between the fixed magnifications and the set magnification which is shifting can be more easily understood, thereby making it possible to set the desired magnification surely and easily.

Now, it is possible to easily set fixed magnifications and an optional magnification which is close to the fixed magnifications by controlling to elongate a count cycle when the magnification counter arrives at a fixed magnification or at a magnification close thereto by operating the zoom key. Particularly when a change in a magnification is slowed down, it is possible to shift a set magnification to a desired magnification without fail, thereby reducing a failure to set a magnification as much as possible without a trouble.

Further, image size setting means for setting an image size of paper size selection means for selecting a paper size may be disposed, the display control means displays a sub message which indicates combinations of image sizes which are set in accordance with a fixed magnification with paper sizes which are specified to the image sizes or a sub message which indicates a combination of a selected paper size with an image size which is specified in accordance with the selected paper size, in a narrowed-down form. Since this reduces the content of the sub message, this encourages the effect that a desired magnification is easily recognized for sure.

Lastly, in order to achieve the object of even more easily setting a fixed magnification by means of a zoom key, the invention provides a magnification setting apparatus for use in an image forming apparatus in which a plurality of fixed magnifications at which a plurality of predetermined image sizes are enlarged or reduced into a plurality of sizes of recording mediums are set and which forms an image on a recording medium at the set magnifications, the magnification setting apparatus comprising: a zoom key for setting a magnification by shifting by a predetermined unit; a magnification counter for serially counting the magnification in accordance with an operation of the zoom key; a display portion for displaying a count content of the magnification counter; judging means for judging whether the count content of the magnification counter corresponds to a predetermined fixed magnification; and display control means for displaying a sub message which indicates combinations of paper sizes and the like corresponding to the fixed magnification, together with the magnification in the display portion and as well for returning contents of display to ones for a precedent fixed magnification upon release of an operation of the zoom key within a predetermined period since arrival of the set magnification at the fixed magnification, when the judging means judges that the content of the set magnification shown by the magnification counter corresponds to a fixed magnification.

When the zoom key is operated and a magnification is successively shifted by the predetermined unit, the display control means returns to an immediately precedent fixed magnification. When the magnification is intermittently shifted by the predetermined unit by means of the zoom key, the display control means maintains the condition of the set magnification without returning to a fixed magnification. Hence, for setting a fixed magnification, even when a set magnification is shifted and passes the fixed magnification through an operation of the zoom key, by releasing the operation of the zoom key within the predetermined period, the display control means displays the immediately precedent fixed magnification again. Further, when a magnification which is close to the fixed magnification is to be set, such a magnification is easily set by intermittently operating the zoom key. In this case, it is more effective to define the predetermined period as a range for judgment in the vicinity of a fixed magnification, by means of the judging means described above.

According to the image forming apparatus of the invention, since only the zoom keys are used for setting of a magnification, a trouble of selecting and operating a number of keys is eliminated, which in turn enables setting of a desired magnification with a simple operation.

In this case, in the vicinity of fixed magnifications, sub messages which are optimal original and paper sizes, for instance, are displayed together with fixed magnifications. Since this allows to set a desired magnification while referring to the displayed sub messages, a failure of setting a magnification or the like is less likely and an operation is simple. That is, where it is impossible to judge whether a desired magnification is reached since only a displayed magnification is displayed, reference to the sub messages makes it easy to recognize and set the magnification.

Further, since the fixed magnifications and the sub messages are displayed all at once along the zoom up or down direction, it is easy to recognize a desired magnification and further simplify setting of the desired magnification.

At this stage, when the fixed magnifications and the sub messages are displayed all at once, in the case that a desired magnification is passed, the display of the desired magnification is erased or alternatively a desired magnification which will be set next is displayed distinctively from other desired magnifications. This makes setting of a magnification easier and more sure.

Further, with respect to setting of a fixed magnification, by returning to an immediately precedent fixed magnification which is passed within a predetermined period of time, it is possible to set a fixed magnification easily and to set an optional magnification easily and accurately.

BRIEF DESCRIPTION OF THE DRAWINGS

Other and further objects, features, and advantages of the invention will be more explicit from the following detailed description taken with reference to the drawings wherein:

FIG. 6 is a view showing a relationship between sub messages and fixed magnifications according to the invention, by means of combinations of original and paper sizes of fixed A- and fixed B-series;

DETAILED DESCRIPTION OF THE PREFERRED EMBODIMENTS

Figure 1:
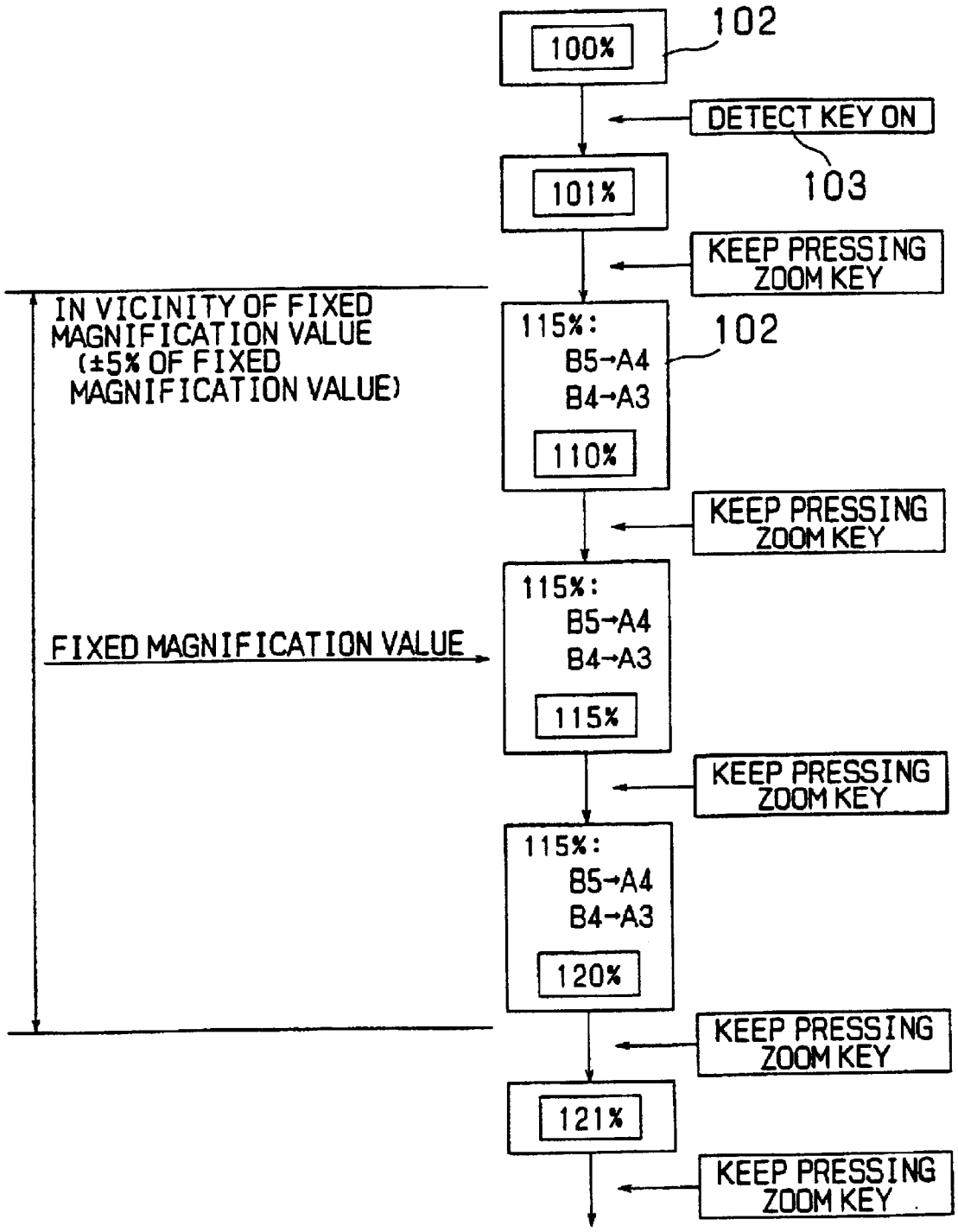
FIG. 1 is a view showing an example of a display according to a first embodiment of the invention wherein in accordance with a change in a magnification which is set a sub message indicating a combination of original and paper sizes under an optimal condition in the vicinity of each fixed magnification.

Now referring to the drawings, preferred embodiments of the invention are described below.

Figure 2:
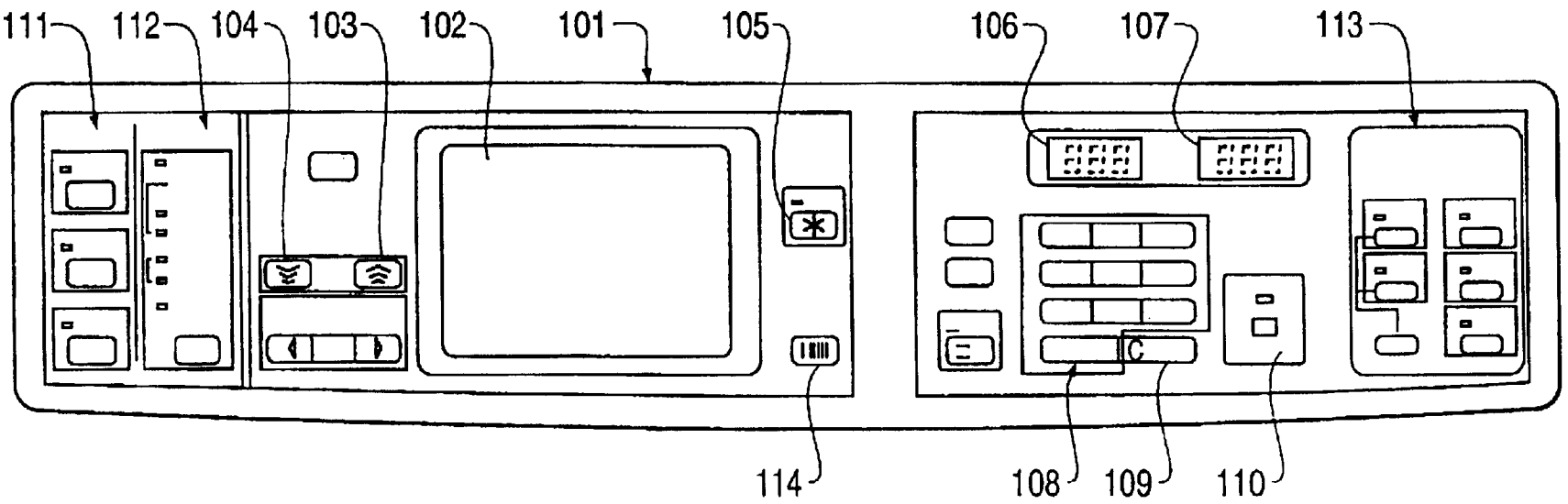
FIG. 2 is a plan view showing one example of an operation panel with which a magnification is set according to the invention.
Figure 3:
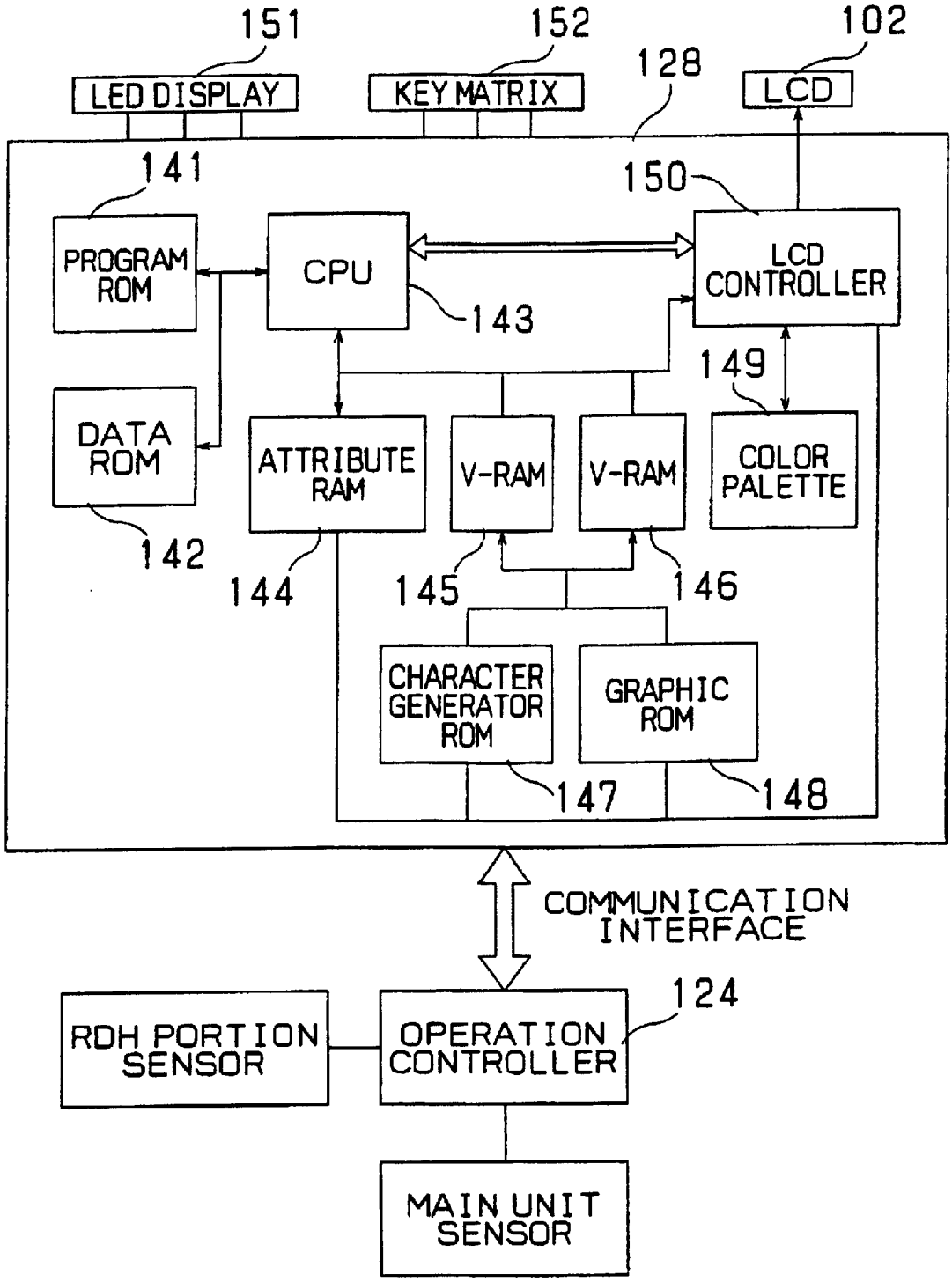
FIG. 3 is a block diagram showing a structure of a control circuit for setting of a magnification, including control for forming an image, according to the invention.
Figure 4:
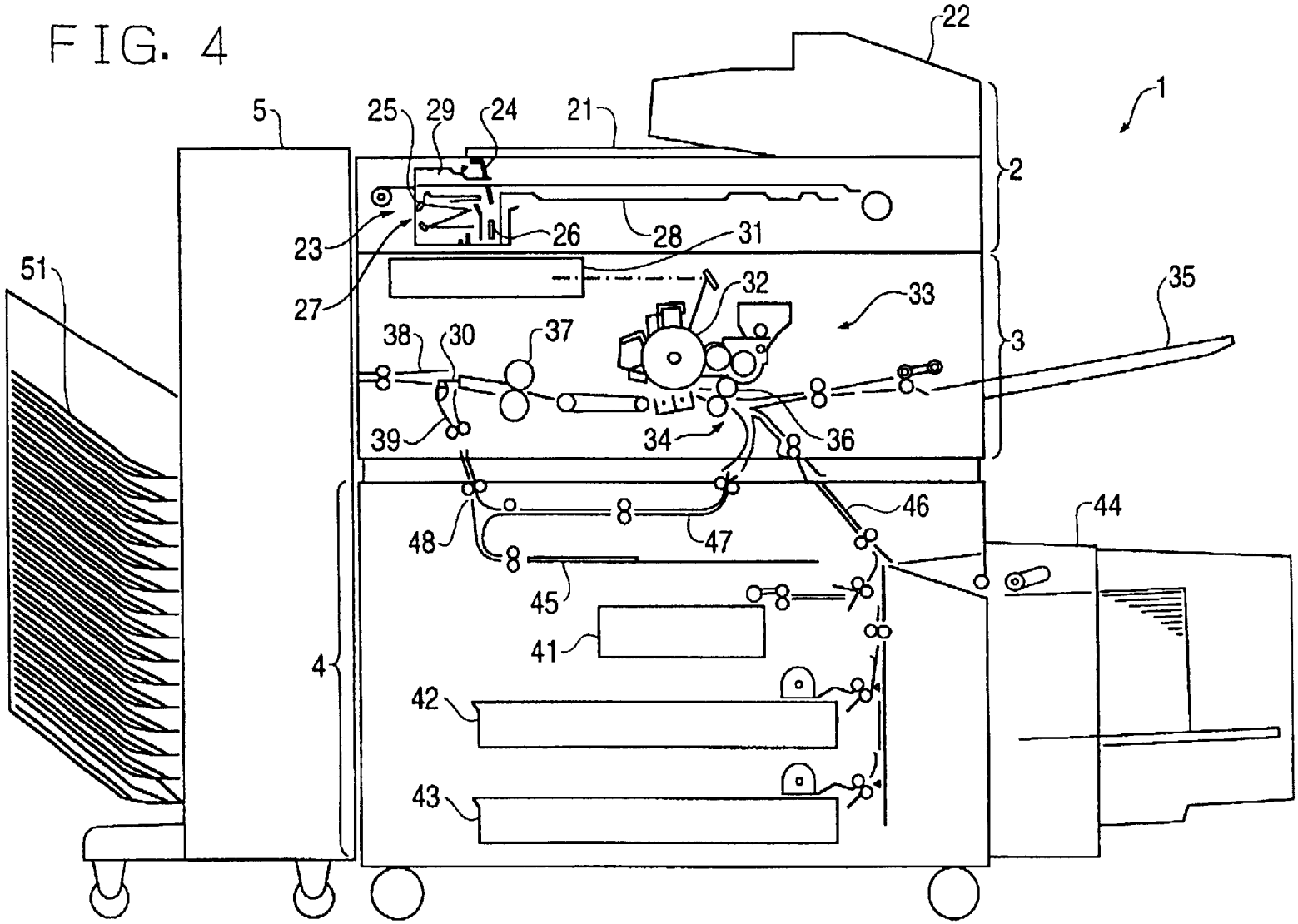
FIG. 4 is a cross-sectional view showing an outline of an inner structure of a digital copying machine which comprises a magnification setting apparatus according to the invention.
Figure 5:
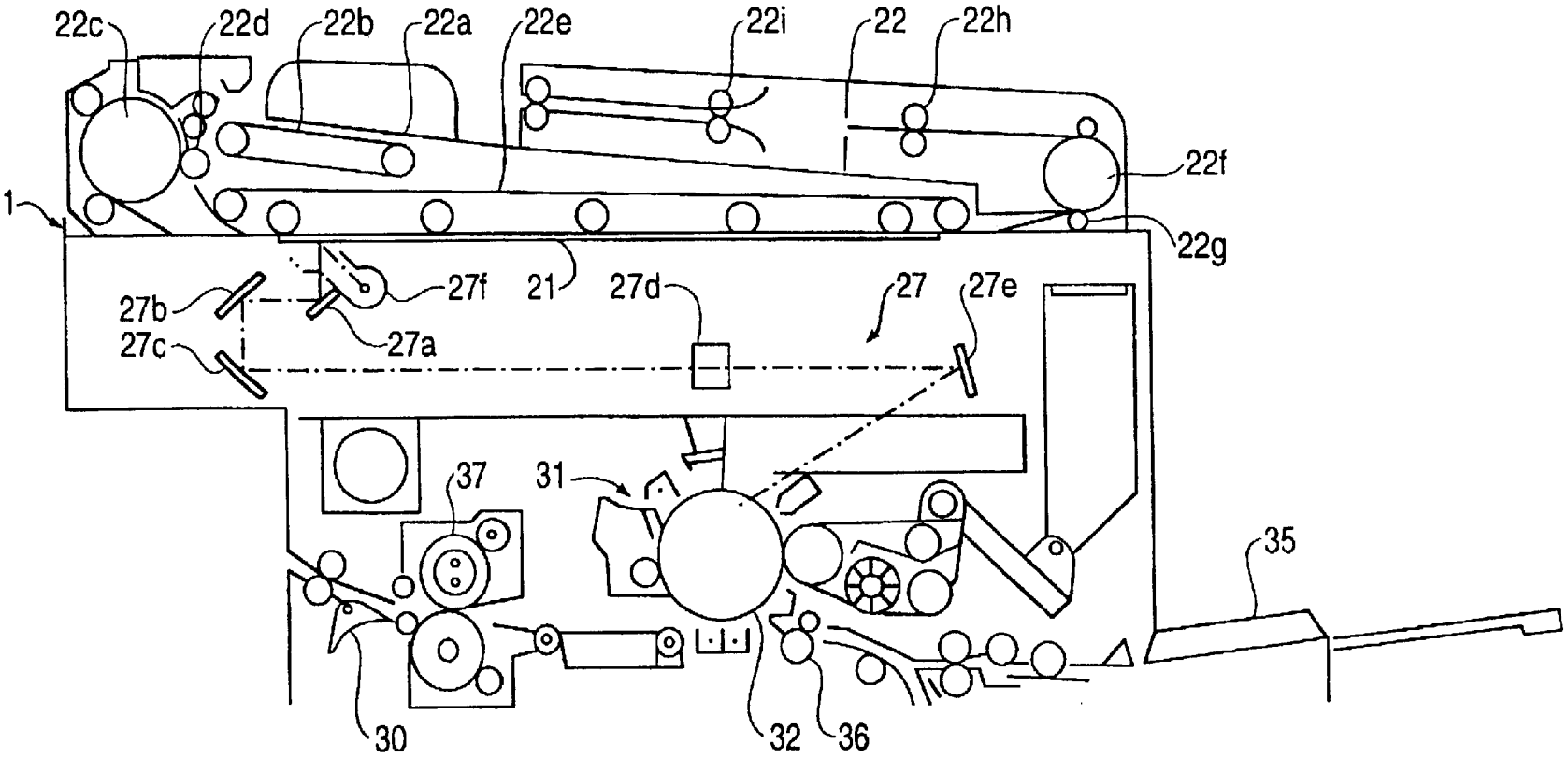
FIG. 5 is a cross-sectional view showing an essential structure of other copying machine which comprises the magnification setting apparatus according to the invention.

FIG. 1 is a view showing original and paper sizes in an optimal condition in the vicinity of a fixed magnification are displayed together with a set magnification as a sub message, in a magnification setting apparatus for use in an image forming apparatus according to a first embodiment of the invention. FIG. 2 is a plan view showing one example of an operation panel with which an operator sets a magnification according to the invention. FIG. 3 is a block diagram showing a circuitry structure of a control portion of a scan panel portion of FIG. 2, including controlling of an image forming operation in the image forming apparatus. FIG. 4 is a cross-sectional view showing an outline of an inner structure of a digital copying machine which comprises the operation panel of FIG. 2. FIG. 5 is an essential cross-sectional view showing one example of a copying machine in other image forming apparatus in which an image exposure portion focuses an analog image, i.e., an original image directly onto a photosensitive material which is a recording medium.

Referring to FIG. 4, an image forming apparatus according to the invention, particularly a digital copying machine, will be described first. In FIG. 4, a copying machine main unit 1 comprises a scanner portion 2, a laser printer portion 3 and a multi-stage paper feed unit 4. In accordance with necessity, the apparatus comprises a sorter 5 which performs post-processing of recording papers which are discharged outside the apparatus, e.g., dividing and sorting of the recording papers.

The scanner portion 2 is formed by an original seater 21 of transparent glass, both-surface type automatic original feeder (RDH) 22 and a scanner unit 23. The scanner unit 23 is provided for reading an image of an original as a digital image, and is formed by an exposure assembly 24 for irradiating an original to be read, an optical system 27 consisting of a plurality of mirrors 25 for reflecting reflected light from the original toward a necessary area and an imaging lens 26, and a CCD 28 which serves as an imaging element onto which the reflected light from the original is focused by the optical system 27 and which performs photoelectric conversion.

The RDH 22 comprises an original seating portion (original tray, not shown) on which a plurality of originals can be set at the same time, and feeds the originals seated on the original seating portion one by one to a reading position. At this stage, a front surface and a back surface of an original which is fed in accordance with necessity is conveyed to the reading position, so that these surfaces are read sequentially. The reading position is set on the same horizontal plane with the original seater 21. A transparent glass plate for reading an image is disposed at the reading position.

The exposure assembly 24, the optical system 27 and the CCD 28 are supported on the same support member 29 which is driven to move parallel to a bottom surface of the original seater 21 at a predetermined speed. As a result, an image of an original which is mounted on the original seater 21 is focused on the CCD 28, whereby images are sequentially read. The support member 29 moves to an original reading position of the RDH 22, stops at that position, and focuses an image of a received original on the CCD 28 through the optical system 27 so that images of originals which are fed are sequentially read. Hence, depending on whether an original is mounted on the original seater 21 or on the RDH 22, the support member 29 is allowed to move along the original seater 21 under control or the support member 29 is moved to and stopped at the original. The exposure assembly 24, the optical system 27 and the CCD 28 are supported on the same support member 29 which is driven to move parallel to a bottom surface of the original seater 21 at a predetermined speed. In other words, by selecting one of a mode for forming an image of an original mounted on the original seater 21 and a mode for forming an image or an original utilizing the RDH 22, the optical system 27 is allowed to scan along the original seater 21 or the optical system 27 is moved to and stopped at the original is controlled.

In a known image processing apparatus not shown, read image data which are obtained after an image of an original is read by the CCD 28 are processed into such a condition so as to be formed and output as an image on a paper by the printer portion 3, and stored once.

The printer portion 3 described above comprises, as principal elements, a laser writing unit 31 which receives the image information which is processed in the image processing apparatus and which is driven under control in accordance with the image information, an image forming process portion 33 which includes a photosensitive material 32 which is a recording medium onto which laser light from the laser writing unit 31 is irradiated. The printer portion 3 is for recording the image information on a recording paper which is appropriately transported. The laser writing unit 31, in particular, comprises a semiconductor laser for emitting laser light (laser beam) corresponding to the image information, a polygon mirror for deflecting the laser light at an equiangular speed, an f-θ lens for correcting so that the laser light which is deflected at the equiangular speed is deflected at the equiangular speed on the photosensitive material 32, etc.

The image forming process portion 33 is in accordance with a known electrophotographic method. An electrifier for uniformly electrifying the photosensitive material 32 to a predetermined polarity, a developer for developing an electrostatic latent image which is formed by irradiation of the laser light, a transfer element for transferring a developed image onto a recording paper which is appropriately transported, a cleaning element for removing toner which remains on a surface of the photosensitive material after transfer, an electricity remover for removing an unnecessary electric charge which remains at the photosensitive material in preparation for next formation of an image, and the like are arranged facing and around the photosensitive material 32.

The printer portion 3 further comprises a transportation system 34 for feeding a recording paper to a transfer position which faces the transfer element of the image forming process portion 33. The transportation system 34 includes a hand paper feeder 35 which is disposed as it sticks out on the right-hand side of the printer portion 3, a resist roller 36 for controlling the state of transportation of a paper in synchronization to rotation of the photosensitive material 32 upon feeding of the paper which is mounted on the paper feeder 35, a fixing portion 37 for fixing an unfixed image on the recording paper after transfer, and a path switching portion 30 for switching a transportation path between a path 38 for discharging the recording paper after fixing outside the printer portion 2 and a path 39 for sending the recording paper to the image forming process portion once again.

On the other hand, separately from the hand paper feeder 35 for feeding a paper into the printer portion 3, the multi-stage paper feed unit 4, which is disposed to successively feed papers of an automatically selected size, comprises a first paper feed cassette 41, a second paper feed cassette 42, a third paper feed cassette 43, which all can be pulled in a forward direction of the drawing, and a fourth paper feed cassette 44 which can be added to the right-most side if selected. Further, separately from these paper feed portions, an intermediate tray 45 is disposed for forming an image on the other side of a paper which has an image formed on one side by the printer portion 3. Further, the multi-stage paper feed unit 4 includes a joint transportation path 46 for sending a paper which is selectively fed from the first, the second, the third paper feed cassettes 41, 42, 43 and the fourth paper feed tray 44 into the transportation system 34 of the printer portion 3, a transportation path 47 for sending a paper with an image formed thereon which is stored in the intermediate tray 45 into the transportation system 34, and a both-surface transportation path 48 for guiding a paper with an image formed thereon which is sent from the printer portion 3 into the intermediate tray 45 so that the paper is stored in the intermediate tray 45.

The joint transportation path 46, the sending-in transportation path 47, the both-surface transportation path 48 link the both transportation paths to each other so that papers can be exchanged with the transportation system 34 which is disposed in the printer portion 3. In the both-surface transportation path 48, although not described, a paper is guided into and stored in the intermediate tray 45 when an image is to be formed on the both surfaces, whereas a paper is guided into the transportation path 47 directly not via the intermediate tray 45 when an image is to be formed on the same surface once again. Hence, the feeding direction of a paper which is guided into the intermediate tray 45 is reversed at the position of the intermediate tray 45, and the paper is sent into the transportation path 47, whereby the paper is transported to the resist roller 36 with the surface with an image reversed. When a paper is sent into the transportation path 47 directly from the both-surface transportation path 48, the paper is transported such that the surface with an image is faced with the image forming process portion 33 again.

Further, the sorter 5 is for receiving papers which are discharged from the printer portion 3 and for discharging and dividing the papers into a multiple of bins 51. The sorter 5 is used selectively in a sort mode with which the same bin receives papers bearing the same page number or in a stack mode with which the same bin receives a plurality number of papers copying the same original.

In the copying machine 1 as described above which is a digital copying machine, an image of an original is decomposed into pixels once, read as such and processed through image processing, and resulting image data are exposed on the photosensitive material 32 of the image forming process portion through the laser irradiating unit 31. At this stage, an image which is irradiated upon the photosensitive material 32 is subjected to enlargement or reduction-processing in accordance with a set magnification through the image processing apparatus described above, and irradiated through the laser irradiating unit 31 described above so that an electrostatic latent image in accordance with the set magnification is formed on a surface of the photosensitive material 32. That is, when the size of an original to be read is A4 and the size of a paper to be used for copying is B4, naturally, as shown in FIG. 6, digital processing is performed at a magnification of 1.22× (122%) and exposure is then performed.

The copying machine 1 as described above is not limited to a digital copying machine but may be in accordance with a method for exposing an image of an original onto the photosensitive material 32 directly as it is. In such a case, the optical system 27 is so structured as shown in FIG. 5 that reflected light from the original which is mounted on the original seater 21 is reflected by three mirrors 27*a*, 27*b*, 27*c* and thereafter further by a fixed mirror 27*e* through an imaging zoom lens 27*d* to irradiate an image upon the photosensitive material 32. To this end, the mirror 27*a* is supported by the same support member with a light source 27*f* and driven parallel to the original seater 21 at a speed V, for instance, while the two mirrors 27*b*, 27*c* are supported by a different support member which is different from the former support member and driven parallel to the original seater 21 at a speed V/2.

The zoom lens 27*d* focuses the reflected light from the original on a surface of the photosensitive material 32 at a focal point which corresponds to a set magnification. The mirror 27*a* and the light source 27*f* are moved under control at a speed in accordance with the magnification. That is, where the set magnification is m, the mirror 27*a* and the light source 27*f* are driven at a speed V/m while the two mirrors 27*b,* 27*c* are driven at a speed V/2 m.

The RDH 22 is so structured that an original which is mounted on an original tray 22*a* is transported onto the original seater 21 by a transportation belt 22*e* which is disposed on the original seater 21 through transportation means which is formed by a paper feed belt 22*b,* a reverse roller 22*c* and a follower roller 22*d.* Once an image of the original is read, that is, once exposure of the image is completed, the original is transported by transportation means which is formed by a reverse roller 22*f* and a follower roller 22*g* and sent back into the original tray 22*a* described above through discharge rollers 22*h,* 22*i.*

When the RDH 22 is operated in a regular RDH mode, originals are transported one by one from the bottom original to the position of the optical system 27 shown in the drawing and an image is exposed while transporting the original without stopping the original, or alternatively, the original is stopped with a leading edge of the original (a rear edge of the original as taken in the transportation direction) at a reference position of the original seater 21 and an image is exposed with the optical system 27 described above scanning along the original seater 21. In this case, in the RDH mode, once exposure of an original is completed one time, the original is sent back into the original tray 22*a.* Meanwhile, when the RDH 22 is operated in an ADF mode, an original is sent back into the original tray 22*a* after completing scanning exposure for a plurality of times set for copying.

The originals and sheets of paper are rectangular or square, and as shown in Table 1, lengths L1 and L2 of two sides which are perpendicular to each other are defined in the Japanese Industrial Standards.

TABLE 1

| Sizes of JIS | | Size L1 (mm) | Size L2 (mm) |
|---|---|---|---|
| A | A3 | 880/4 | 625/2 |
| | A4 | 880/4 | 625/4 |
| | A5 | 880/8 | 625/4 |
| B | B4 | 1085/4 | 765/4 |
| | B5 | 1085/8 | 765/4 |

Enlargement ratio E and reduction ratio R will be described. As an example of the enlargement ratio E is indicated an enlargement ratio of 115% in formulae (1) and (2). For example, E(B5/A4) indicates enlargement of from B5 of original size to A4 of paper size, and other ratios of enlargement and reduction are indicated in such manner.

$$E(B5/A4) = \frac{880}{4} \Big/ \frac{765}{4} = \frac{625}{4} \Big/ \frac{1085}{8} \quad (1)$$

$$E(B4/A3) = \frac{880}{4} \Big/ \frac{765}{4} = \frac{625}{2} \Big/ \frac{1085}{4} \quad (2)$$

When the enlargement ratio E is 122%, the following manners are possible.

$$E(A5/B5) = \frac{1085}{8} \Big/ \frac{880}{8} = \frac{765}{4} \Big/ \frac{625}{4} \quad (3)$$

-continued $$E(A4/B4) = \frac{1085}{4} \Big/ \frac{880}{4} = \frac{765}{4} \Big/ \frac{625}{4} \quad (4)$$

When the enlargement ratio E is 141% the following enlargements are possible.

$$E(A5/A4) = \frac{880}{4} \Big/ \frac{625}{4} = \frac{625}{4} \Big/ \frac{880}{8} \quad (5)$$

$$E(A4/A3) = \frac{625}{2} \Big/ \frac{880}{4} = \frac{880}{4} \Big/ \frac{625}{4} \quad (6)$$

$$E(B5/B4) = \frac{765}{4} \Big/ \frac{1085}{8} = \frac{1085}{4} \Big/ \frac{765}{4} \quad (7)$$

When the reduction ratio R is 70%, the following reductions are possible. For example, R(A3/A5) indicates reduction of from A3 of original size to A5 of paper size, and other magnifications are indicated in such manner.

$$R(A3/A5) = \frac{880}{8} \Big/ \frac{625}{2} = \frac{625}{4} \Big/ \frac{880}{4} \quad (8)$$

$$R(A3/A4) = \frac{880}{4} \Big/ \frac{625}{2} = \frac{625}{4} \Big/ \frac{880}{4} \quad (9)$$

$$R(B4/B5) = \frac{1085}{8} \Big/ \frac{765}{4} = \frac{765}{4} \Big/ \frac{1085}{4} \quad (10)$$

When the reduction ratio R is 81%, the following reduction are possible.

$$R(B5/A5) = \frac{880}{8} \Big/ \frac{1085}{8} = \frac{625}{4} \Big/ \frac{765}{4} \quad (11)$$

$$R(B4/A4) = \frac{880}{4} \Big/ \frac{1085}{4} = \frac{625}{4} \Big/ \frac{765}{4} \quad (12)$$

When the reduction ratio R is 86%, the following reduction are possible.

$$R(A4/B5) = \frac{1085}{8} \Big/ \frac{625}{4} = \frac{765}{4} \Big/ \frac{880}{4} \quad (13)$$

$$R(A3/B4) = \frac{1085}{4} \Big/ \frac{625}{2} = \frac{765}{4} \Big/ \frac{880}{4} \quad (14)$$

<First Embodiment>

Next, a detailed description will be given on an embodiment which simplifies the operation of setting a magnification with the copying machine 1 as described above.

To set a magnification, in addition to magnification setting keys, on an operation panel, there are a number of keys provided for setting other types of various copying conditions and a display apparatus or the like for sequentially displaying the conditions, as shown in FIG. 2.

In FIG. 2, the operation panel 101 comprises a liquid crystal display apparatus (hereinafter "LCD," i.e., Liquid Crystal Display) 102 which serves as displaying means for displaying a set magnification according to the invention and other necessary information, a zoom up key 103 and a zoom down key 104 which serve as keys for setting magnifications according to the invention as well as zoom keys for changing a magnification by 1% at a time, an operation guide key 105 for guiding an operation condition and the like of the copying machine if necessary, a set copy number display portion 106 for displaying the number of copies to be made, a copy end display portion 107 for displaying the number of copies already made, ten numeric keys 108 for setting the number of copies to be made and other numbers, a clear key 109 for clearing the set number of copies to be made, and a copy start key (i.e., a print switch) 110 for starting copying. Further displayed on the operation panel 101 are a sorter function setting portion 111 for designating processing performed with a sorter 51 such as stacking and sorted discharging, a copy mode setting portion 112 for setting modes such as a both-side copy mode, a one-side copy mode and an RDH mode, a function setting portion 113 for ensuring a binding margin of a recording paper with an image formed thereon and for setting image processing functions such as centering and trimming, etc. Further, denoted at 114 is a paper selection key for selecting paper.

The zoom up key 103 on the operation panel 101 described above is operated to gradually increase a magnification by 1% each time, i.e., for the purpose of zooming up. The zoom down key 104 is operated to gradually decrease a magnification by 1% each time, i.e., for the purpose of zooming down.

The operation panel 101 is connected to a main CPU 124, which controls an image forming operation of the copying machine, through a communication interface, as shown in FIG. 3. A key matrix 152, which is formed by connecting the ten numeric keys 108, the magnify/reduce keys 103, 104, the operation guide key 105 and other various operation keys in the form of a matrix, an LED display portion 151 for displaying a set function and the like, and an LCD 102 according to the invention, in particular, are controlled through an operation panel control portion 128.

The operation panel control portion 128 comprises a program ROM 141, a data ROM 142, a CPU 143, an attribute RAM 144, a V-RAMs 145, 146, a character generator ROM (hereinafter "CG-ROM") 147, a graphic ROM 148 for displaying a magnification according to the invention, a color pallet 149, and an LCD controller 150.

The program ROM 141 described above forms the display control means according to the invention, together with the CPU 143, the LCD controller 150 and the like, and stores control programs, especially, a program for controlling the operation panel, in advance. The data ROM 142 stores data expressing a message consisting of characters which describes a series of operation procedures for jamming in the copying machine main unit 1 and at each portion such as the RDH 22, storage addresses of data and display color information in the graphic ROM 148, and information such as a sub message or the like which is used for setting a magnification according to the invention, each in the form of a code in advance. The CPU 143 is connected to the main CPU 124 of the image forming apparatus through the communication interface. In accordance with an input from the CPU 124, controlling based on the program which is stored in the program ROM 141 is performed.

Further, with respect to display data which are written into the RAM 144, the attribute RAM 144 instructs the LCD controller 150 to perform flashing, black-and-white reversing and the like of a display image which is displayed by the LCD 102. The V-RAMs 145, 146 are memories for temporarily storing display data, such as a magnification display according to the invention and message data which are graphically displayed, which are to be displayed by the LCD 102 in the form of code data. The CG-ROM 147 stores fonts for the respective characters. The graphic ROM 148 stores graphic data such as a displayed magnification (which is displayed with large characters) according to the invention, an original size for the copying machine, a selected paper size, etc., in advance.

For better understanding of the structure described above, an easy function will be described. First, the zoom up key 103 or the zoom down key 104 which are disposed on the operation panel 101 is operated, a signal expressing this operation is input to the CPU 143 of the operation panel control portion 128 through the key matrix 152, this operation condition is confirmed, and the signal is fed to the main CPU 124 of the copying machine main unit through the communication interface. Receiving this operation signal, on the main CPU 124 side, sequential counting of a magnification is performed. That is, when the zoom up key 103 is operated, a counter is incremented by "1." This is setting of the magnification by 1% each time. The content of the counter indicates an initial value, particularly 100% of standard use, upon turning on of a power source. For instance, "100" is preset.

On the main CPU 124 side, data expressing a copy magnification (image magnification) which is counted are forwarded to the operation panel control portion 128 through the communication interface. Upon reception of this magnification data at the CPU 143, in accordance with the content of the program ROM 141, the magnification data are converted into bit data or the likely by the CG-ROM 147 and the graphic ROM convert, stored in the V-RAMs 145, 146, and displayed by the LCD 102 through the LCD controller 150. At this stage, during setting of a magnification according to the invention, in a condition close to a fixed magnification, to display a message, e.g., a sub message according to the invention such as "A4→B5" indicating an original size and a paper size which are an optimal condition with which an image can be formed at that fixed magnification, separately from the displayed magnification, the data are written into the V-RAMs 145, 146 and displayed by the LCD 102.

The LCD controller 150 reads out the stored data from the V-RAMs 145, 146 or the like through the CG-ROM 147 as described above, and drives the LCD 102 and make the LCD 102 display in accordance with the data which are read. At this stage, when the LCD 102 is to display graphic besides a magnification and a message, the data are read through the graphic ROM 148.

The attribute RAM 144 is used to make the LCD 102 partially flash, reverse or otherwise display if necessary as described earlier. The color pallet 149 stores color data which are necessary for the LCD 102 to display in colors, and is used particularly for displaying data in colors for a color display area stored in the V-RAMs 145, 146.

The main CPU 124, with the operation panel control portion 128, controls not only the operation panel portion through the communication interface as described above, but also an image forming operation of the copying machine main unit 1. For instance, upon inputting of detection signals from various detection sensors of the copying machine main unit 1 and the like, the image forming process portion 33 of the printer portion 3 is controlled while at the same time automatic selection of a paper, feeding and transportation of papers are controlled, whereby formation of an image is sequentially controlled. Further, signals from various detection sensors of the RDH 22 are also input, so as to concurrently control transportation of an original by the RDH 22.

In the first embodiment described below of the invention, the zoom keys are only magnification setting keys. A description will be given on simplified setting of an optional magnification by means of operating the zoom keys, especially the zoom up key 103 or the zoom down key 104. Therefore, separately from the zoom keys, in accordance with necessity as in the conventional case, needless to mention, fixed magnification keys or the like may be disposed. In the invention, use of the zoom keys makes it easier to set fixed magnifications and other optional magnification than heretofore possible and the operability of the keys is improved.

Before moving to a detailed description, a brief description will be given on a characteristic of setting of a magnification according to the invention. For instance, when a fixed magnification is to be set as an image formation magnification, either one of the zoom up key 103 and the zoom down key 104 is operated. In accordance with this operation, a magnification upon start (initial stage) is increased or decreased by 1% each time and displayed. At this stage, when the magnification becomes close to predetermined fixed magnifications such as 86% and 115%, the LCD 102 displays, as a sub message, a combination of an optimal original size and an optimal paper size with fixed sizes for a fixed magnification of 86% or 115%, in accordance with the displayed fixed magnification. As herein termed, an original size not only refers to a sheet-like original size, but also to an image size or the like which is inputted through a scanner and image inputting means (e.g., a word processor, a personal computer), for instance, in the case of a digital image.

An operator can learn a condition of a fixed magnification by looking at a displayed magnification and a sub message at the same time while operating keys to set a magnification as described above. Hence, based on the content which is displayed as a sub message for each fixed magnification, a user can easily set a fixed magnification. Further, when an optional magnification which is in the vicinity of a fixed magnification is to be set, since reference to a displayed sub message helps setting of a magnification, an operation for this purpose is simple.

Figure 7:
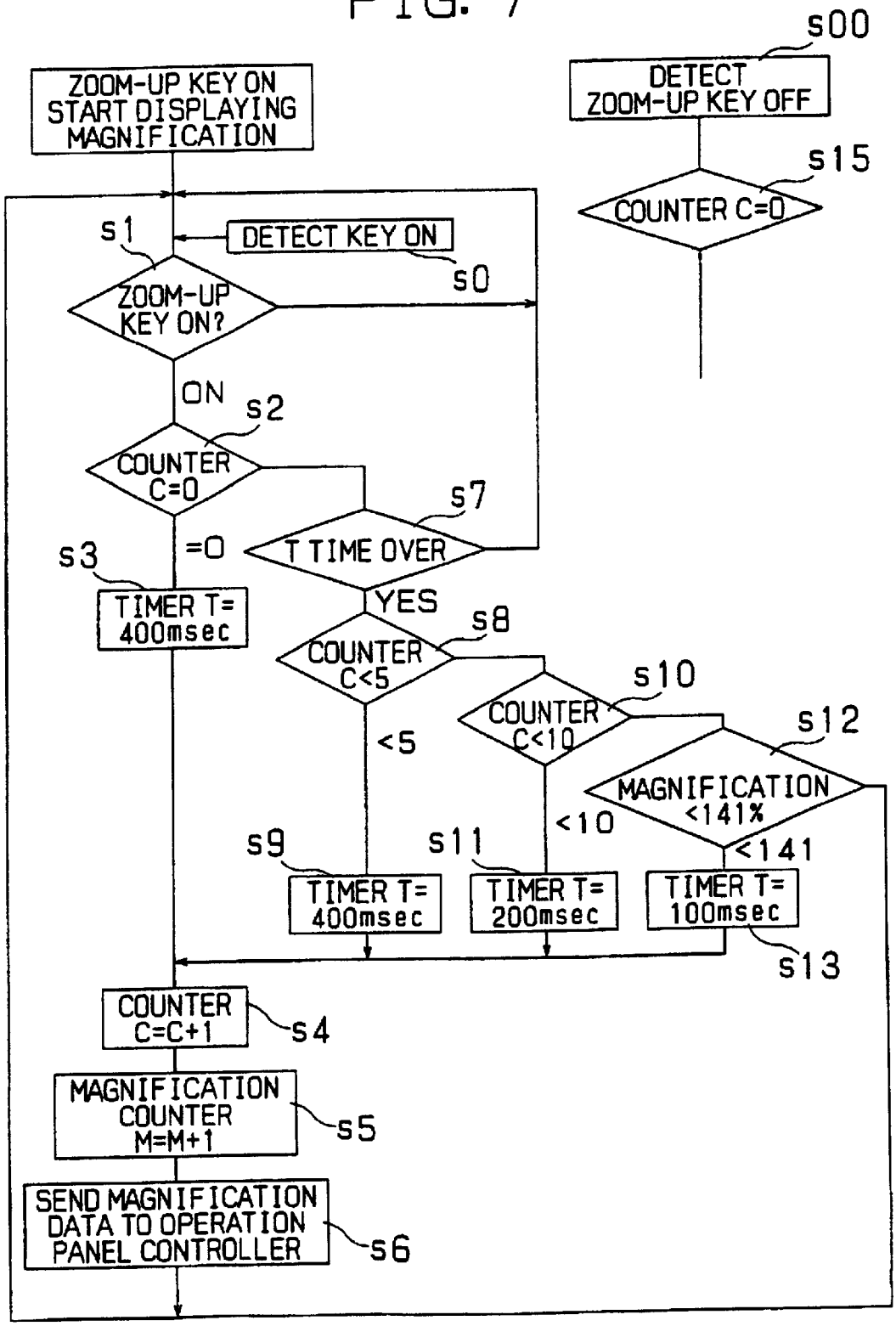
FIG. 7 is a flow chart for controlling a change in magnification in a zoom up direction by means of an operation of a zoom up key for the purpose of setting a magnification.
Figure 8:
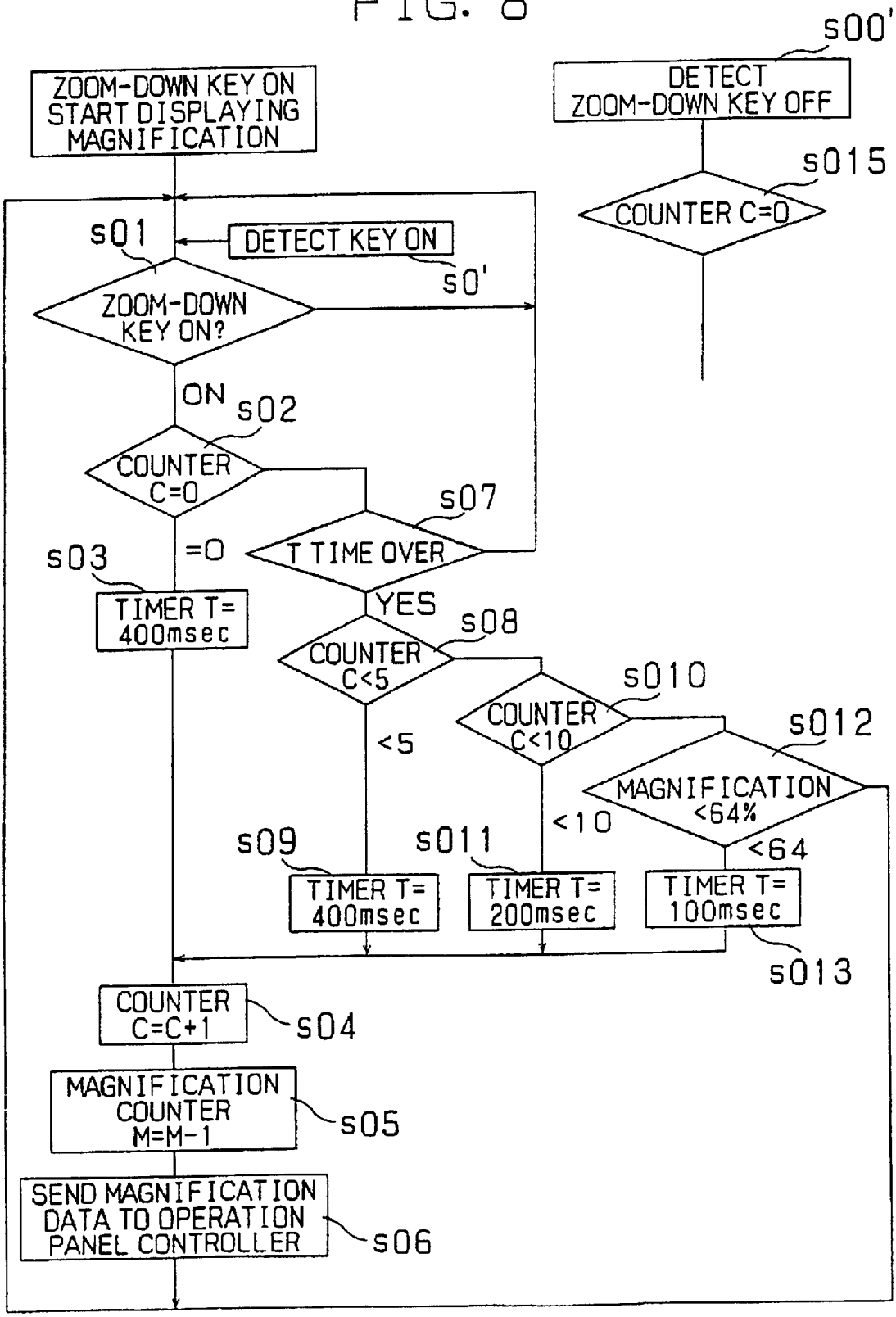
FIG. 8 is a flow chart for controlling a change in magnification in a zoom down direction by means of an operation of a zoom down key for the purpose of setting the magnification.

FIGS. 7 and 8 show a basic control flow of a condition in which enlargement (zooming up) or reduction (zooming down) is performed by 1% each time by operating the zoom up key 103 or the zoom down key 104. With reference to these drawings, a control condition for zooming up or down will be described. This is merely to describe an example where a magnification is shifted by 1% each time, without binding the invention to this particular example.

First, when the magnify key (zoom up key) 103 of the operation panel 101 is operated, zoom up control which increases a magnification by 1% each time as shown in FIG. 7 is performed while when the zoom down key 104 of the operation panel 101 is operated, a magnification decreases by 1% each time as shown in FIG. 8. Upon operation of the zoom up key 103 or the zoom down key, this operation condition is confirmed (S1 or S01) and whether the content of the counter is "0" is confirmed (S2 or S02). The counter, which is for successively increasing or decreasing a magnification when a condition that the zoom up key 103 or the zoom down key 104 is operated (ON) is maintained, initially slows down under control a shifting cycle of increasing or decreasing a magnification but quickens under control the shifting cycle of increasing or decreasing the magnification as a time period of the operation becomes longer to thereby shorten a time which is necessary to set a desired magnification.

Here, the content of the counter C is "0", a timer T is set at 400 msec, and a timer operation is started (S3 or S03). Following this, the content of the counter C is incremented (S4 or S04) by "1" count while incrementing or decrementing the content of a magnification counter M similarly by "1" count (S5 or S05). The magnification which is set in this manner is fed to the operation panel control portion 128 (S6 or S06).

On the other hand, the main CPU 124 side returns to S1 (or S01). At this stage, the sequence proceeds from S1 (or S01) to S2 (or S02) upon confirmation at a step S0 (S01) that the zoom up key 103 or the zoom down key 104 is being continuously operated, the content of the counter as not being "0" is confirmed, whether the timer T which is preliminarily set has measured 400 msec is confirmed (S7 or S07), and when this is not confirmed, an operation of S1(S01)→S2 (S02)→S7 (S07) is repeated. As the timer T measures 400 msec, whether the content of the counter C is smaller than 5 is checked (S8 or S08), the timer T is set at 400 msec again (S9 or S09) and measurement of time is started, so that the content of the counter C is incremented by "1" count (S4 or S04) while the content of the magnification counter M is incremented or decremented by "1" count (S5 or S05), the contents are transferred to the operation panel control portion 128 (S6 or S06) and displayed through the LCD 102.

As described above, by keeping the zoom up key 103 or the zoom down key 104 continuously operated, zooming up or down by 1% respectively each time is performed every 400 msec. The counter C indicates "5" upon increment of 5%, and the sequence shifts as S8 (S08)→S10 (S010)→S11 (S011), so that from the next time, the timer T is set at 200 msec (S11 or S011) and zooming up or down by 1% respectively each time is performed every 200 msec. After a change in the magnification by 10%, the sequence shifts as S12 (S012)→S13 (S013) and zooming up or down by 1% respectively each time is performed every 100 msec. At S12, with the content of the magnification counter M already reaching "141," setting of a larger magnification is impossible. Similarly, at S012, with the contest of the magnification counter for "64" already reaching the setting of a larger reduction is impossible. Hence, the sequence returns to S1 (S01) without altering the magnification counter and the like. In other words, the zoom up key zoom down key is kept continuously operated (ON), and when the magnification reaches the respective upper or lower limit, the resulting magnification is maintained to prohibit setting of a larger magnification or reduction.

Further, in the case where the zoom down key 104 is operated, as shown in FIG. 8, conversely, zooming down by 1% each time is performed and a changing condition is serially displayed by the LCD 102. When the operation of the zoom up key 103 or the zoom down key 104 is released (OFF), the resulting condition is detected at the step S00 (or at a step S00), the content of the counter C is cleared to "0" in the resulting condition (S15 or S015). However, the magnification counter M maintains the set content. However, upon turning on of a power source or when the copying machine used to be left without used for a predetermined period of time, since a set magnification is 100% as an initial value, the magnification counter M is preset to "100." Hence, operating the zoom up key 103 or the zoom down key 104 in such a condition increases or decreases the content of 100% by 1% each time.

On the operation panel control portion 128 side, set magnification data fed from the main CPU 124 side are displayed by the LCD 102, as described earlier. Further, according to the invention, the LCD 102 displays a sub message together with the magnification, in accordance with the magnification data fed from the main CPU 124.

Figure 9:
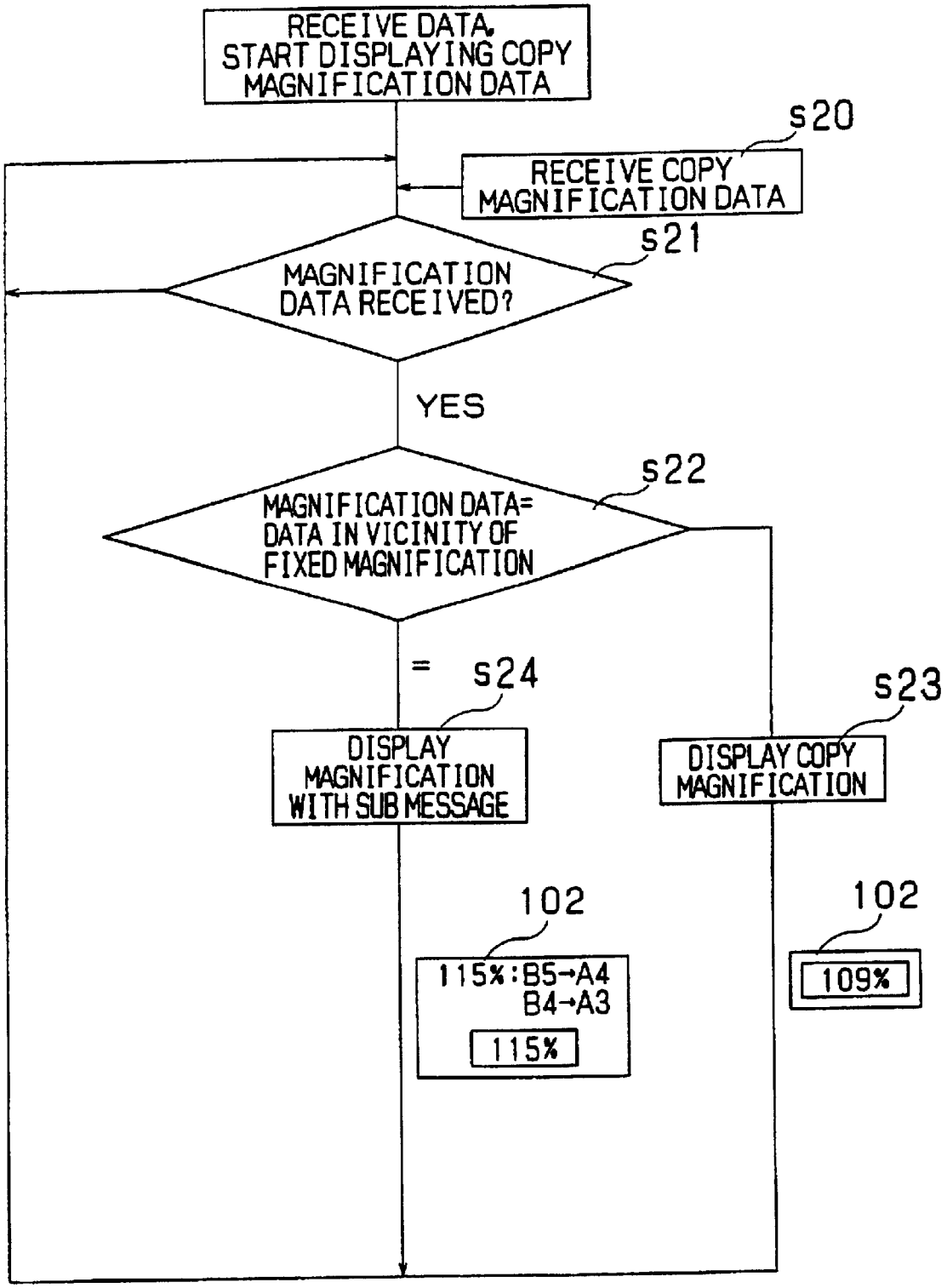
FIG. 9 is a flow chart for displaying a set magnification together with a sub message according to the invention.

Describing this with reference to the control flow which is shown in FIG. 9, on the operation panel control portion 128 side, when the magnification data are transferred from the main CPU 124, at a step S20, the condition that the magnification data are transferred is confirmed so that the sequence progresses as S21→S22 and whether the transferred magnification data are in the vicinity of a fixed magnification is confirmed (S22). The fixed magnification data are stored in the data ROM 124, for instance, and compared with the magnification data which are set described above.

In the case where it is possible to set a magnification in the range between 64% and 141%, the data ROM 142 stores 70%, 81%, 86%, 115%, 122% and 141% as fixed magnifications, as shown in FIG. 6. Further, during comparison, a magnification is confirmed against the range of ±5% of the fixed magnifications above, for instance, in this embodiment. For instance, between 76% and 86%, 81% is judged Yes at the step S22. The step S22 is judging means for judging whether a magnification which is set according to the invention (which is counted by the magnification counter M) is the fixed magnifications or a magnification in the vicinity of the fixed magnifications.

In the case where it is confirmed that the set magnification is not in the vicinity of a specific fixed magnification, at a step S23, the set magnification alone is graphically displayed in a predetermined area of the LCD 102. However, when it is confirmed that the set magnification data are in the vicinity of a specific fixed magnification, at a step S24, the set magnification is displayed and at the same time a sub message is displayed in a regular form of characters, particularly the contents which are stored in the CG-ROM 147. As a sub message, a combination of an optimal original size and an optimal paper size under an optimal condition is used. For instance, as shown in FIG. 6, for a fixed magnification of 70%, the contents are such as A4 (original or image size)→A5 (paper size), A3→A4 and B4→B5.

Referring to FIG. 1 once again, displaying a magnification according to the first embodiment of the invention will be described. For simplicity of a description, the drawing shows a condition in which a shifting magnification displayed by the LCD 102 during zooming up of a set magnification from an initial magnification of 100% (equal magnification) by operating the zoom up key 103. As shown in FIG. 1, as the zoom up key 103 is operated in the 100%-condition and this operation is continued, the magnification is zoomed up serially like 101%, 102% . . . When the magnification is zoomed up to a magnification which is in the vicinity of the initial fixed magnification of 115%, e.g., a magnification of 110%, the set magnification is graphically displayed (with large characters) while at the same time a sub message is displayed which is an original size and a paper size under an optimal condition for copying at the fixed magnification of 115%. The sub message is displayed while the magnification is between 110% and 120%, and when the magnification becomes 121% or larger, the sub message is erased and only the magnification which is set by successively operating the zoom up key 103 is displayed at a predetermined position. Although the foregoing has described that ±5% is regarded as the range around a fixed magnification, an optional value may be set as the range.

As described above, a sub message is displayed when the set magnification during zooming up and the zoomed up magnification are in the vicinity of a fixed magnification, e.g., ±5% of the fixed magnification. Conversely, in the case where the zoom down key 104 is operated, in a similar manner, when the set magnification which is being zoomed down reaches ±5% of the fixed magnification, a sub message for the fixed magnification is displayed.

According to this embodiment, as described above, when the set magnification becomes close to a specific fixed magnification as a result of an operation of the zoom up key 103 or the zoom down key 104, a sub message is displayed together with the set magnification. Since an operator looks at these displays, the operator can judge displayed original and paper sizes under an optimal condition, without judging a set magnification. This simplifies setting of a desired magnification which is performed by the operator. Further, the operator only has to be knowledgeable of a magnification itself, the operator can easily operate a desired magnification condition only by looking at a set magnification not at a sub message. Thus, the operation is simple similarly to a skilled operator and an unskilled operator.

Figure 10A:
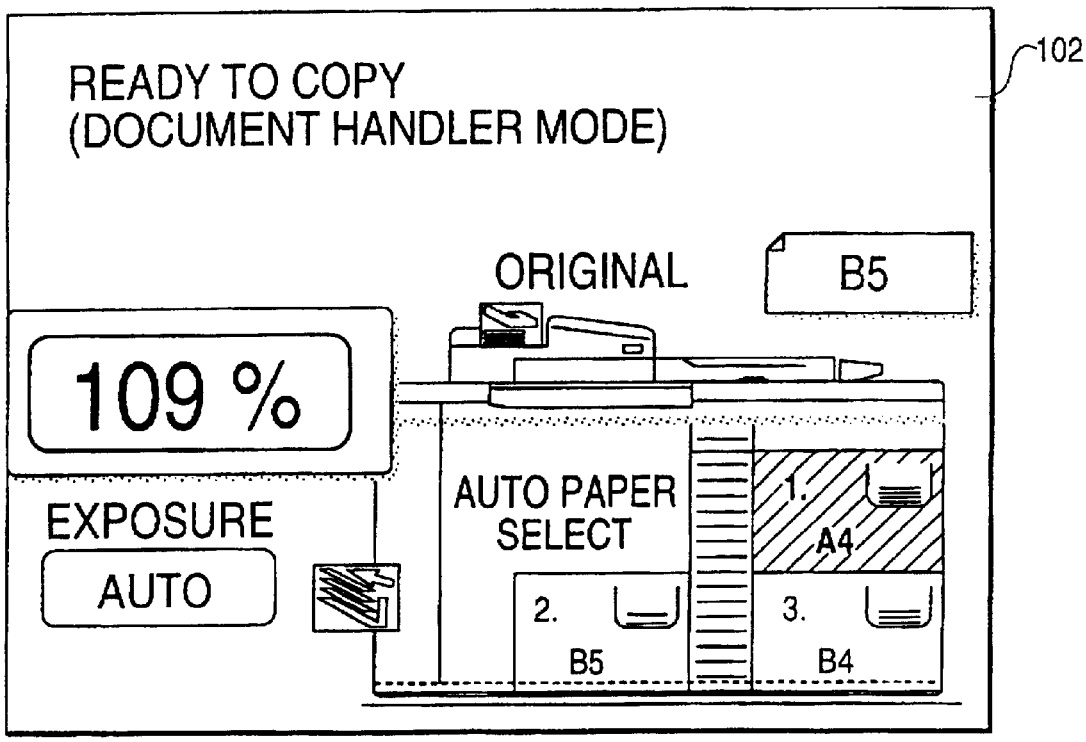
FIGS. 10A and 10B are views showing examples of display wherein together with a set magnification, an original size and a paper size selected from among paper sizes of papers which are fed are displayed, FIG. 10A showing a display form regardless of fixed magnification, FIG. 10B showing a display form which includes a sub message for a fixed magnification.
Figure 10B:
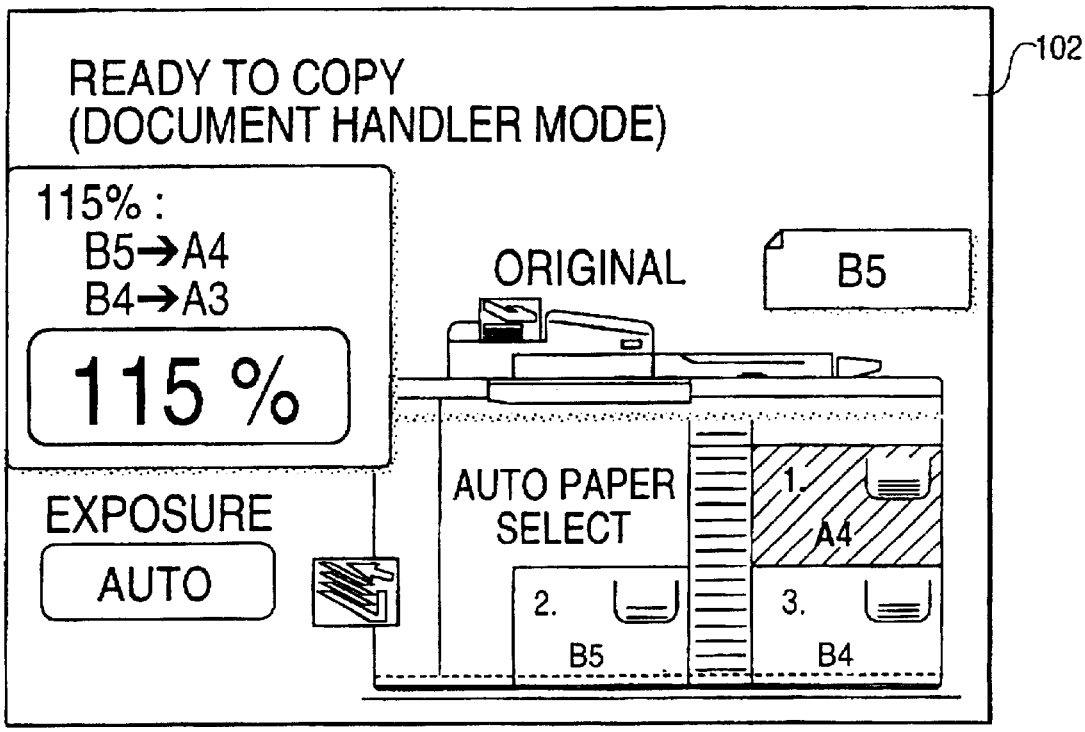

In FIG. 9, when a set magnification is not or is in the vicinity of a fixed magnification at the step S23 or S24, a sub message is displayed together with the fixed magnification. In these displays, as shown in FIG. 10A or 10B, an original size (e.g., B5) of an original which is set on an original tray in the copying machine 1 and a selected paper size (e.g., A4) are graphically displayed at the same time. For such displaying, the data ROM 142 stores codes and the like for expressing the copying machine, bit data which are necessary for displaying in correspondence with the codes are read through the graphic ROM 148 and displayed through the LCD controller 150. For the original and paper sizes, corresponding data are transferred from the main CPU 124 to the CPU 143, so that those displays are displayed.

The displays as those shown in FIG. 10 are provided altogether, it is possible to grasp the displayed sub message and a fixed magnification based on the present original and paper sizes in an easy manner. Thus, using the zoom keys, the fixed magnification is set easier and more surely. Further, when an optional magnification which is in the vicinity of the fixed magnification is to be set, reference to such a display makes it possible to accurately set the magnification.

As in the example shown in FIG. 6, as the fixed magnifications, the fixed magnifications for the A- and the B-sizes are illustrated. However, this is not limiting but is similar for sizes which are measured in inches. For instance, as the fixed magnifications are given 64% (8.5×11→5.5×8.5, 11×17→8.5×11), 77% (8.5×14→8.5×11, 11×17→8.5×14), 121% (8.5×14→11×17). Hence, for sizes which are measured in inches as well, in response to an operation of the zoom up key 103 or the zoom down key 104, when the magnification reaches a value within a range of ±5% of the fixed magnifications above, a sub message under an optimal condition with original and paper sizes of that time point is displayed together with the magnification.

In the embodiment described above, when a sub message is to be displayed in the range of ±5% of (i.e., in the vicinity of) a fixed magnification, there is an overlapping area between the fixed magnifications of 115% and 122%. That is, in the magnification range between 117% and 120%, a magnification enters in the vicinity of the two fixed magnifications. In such a case, priority is placed on the fixed magnification of 115%. In the case where the magnification is to be shifted up to 120%, a sub message indicating 115% is displayed, and a sub message indicating the fixed magnification of 122% is displayed when the set magnification reaches 121%. This makes a boundary between the fixed magnifications of 115% and 122% clear, and therefore, it is possible to distinguish the fixed magnifications easily.

Alternatively, with respect to the overlapping area described above between the fixed magnifications of 115% and 122%, sub messages for the both fixed magnifications may be displayed together. In other words, in the range between 117% and 120%, sub messages for the fixed magnifications of 115% and 122% may be displayed as they overlap with each other. In this case, separately from the fixed magnification of 115%, for the fixed magnification of 122%, a sub message reading "A5→B5" and "A4→B4" is displayed. Therefore, an operator can perform processing, utilizing this display as judgment information for distinguishing the fixed magnifications from each other.

To avoid such overlapping in the magnification ranges which overlap with each other in the vicinity of the fixed magnifications, the range in the vicinity of a fixed magnification may be defined. In this case, the range in the vicinity may be set as ±3%, for the fixed magnifications of 115% and 122%, in order to avoid overlapping. The fixed magnifications which overlap with each other are the fixed magnifications of 81% and 86% for reduction. For these fixed magnifications as well, a sub message may be displayed for each one of the fixed magnifications in the manner described above.

The operation above is a condition where the zoom up key 103 is being continuously operated. When the operation is released (OFF) in the middle of the operation, a set magnification at that time is displayed and a sub message is also displayed near a fixed magnification. In this case, after a certain period of time since the operation of the zoom up key 103 is released, the sub message may be erased or may be kept continuously displayed.

The sub messages described above are stored in the data ROM 142 in a relative relationship as that shown in FIG. 6. The contents of the data ROM 142 are read out and displayed by LCD 102 through the V-RAMs or the CG-ROM. At this stage, when a figure expressing a magnification is to be graphically displayed, corresponding display data are stored in the graphic ROM 148, read out through the graphic ROM 148 and displayed by LCD 102 through the LCD controller 150.

In FIGS. 7 and 8, with respect to an operation of the zoom up key 103 or the zoom down key 104, although the foregoing has described that a magnification is zoomed up or down by 1% each time every 400 msec initially around the start of the operation but every 100 msec at the last stage, this is not limiting. That is, the magnification may be zoomed up or down every predetermined time, e.g., from the beginning, as long as the speed allows an operator to visually recognize a changing magnification in setting the magnification.

With respect to displaying of a magnification, described above, since a magnification is changed every predetermined time, the time period for shifting the magnification is quickened to speed up setting of a desired magnification. Due to this, the timing for judging a desired magnification value and releasing a key operation may fail in some cases, thereby creating a condition when the magnification is yet to reach the desired magnification or over the desired magnification.

To deal with such a situation, when a sub message is displayed in the vicinity of the fixed magnifications above, changing of the magnification is slowed down in accordance with the displayed sub message. For example, the foregoing has described that according to this embodiment, at the start of an operation of the zoom up key 103 or the zoom down key 104, zooming up or down is performed every 400 msec, and after a change by 10%, zooming up or down is performed every 100 msec, whereby the desired magnification is passed away or fails to be reached in some cases. Therefore, in the case where the zoom up key 103 or the zoom down key 104 is continuously operated in the vicinity of the fixed magnifications, particularly since a sub message is displayed, it is possible to zoom up or down every 400 msec. As described earlier, this is carried out more easily by means of a time which is set with the timer T, and together with the timer T, constitutes the count control portion for controlling a cycle for counting up or down of the magnification counter M, and particularly a cycle of changing a magnification by 1% each time.

In this embodiment, switching among three levels is performed during zooming up or down. That is, 400 msec initially, 200 msec next, and 100 msec at last. This is not limiting. Rather, during zooming up or down, when zooming up or down is carried out every predetermined time, e.g., 100 msec from the beginning, during a period in which a sub message associated with a fixed magnification is displayed, it is possible to set a desired magnification easily even though a change is every 200 msec as described above. In short, while a sub message is displayed, a magnification may be changed during zooming up or down every longer time than preliminarily performed.

However, with respect to the initial change of every 400 msec, since setting a longer time unit is bothersome, 400 msec is maintained while a magnification is changed 1% at a time. That is, the time unit longer than the longest time unit is not allowed.

According to this embodiment described above, since a change in a magnification which is set in the vicinity of the fixed magnifications (i.e., the change by 1% at a time) is slowed down, setting of the magnification in the vicinity of the fixed magnifications is easily and more surely realized by operating only once. This shortens time which is necessary for setting a magnification and improves the operability.

<Second Embodiment>

Next, a second embodiment of the invention will be described. The second embodiment requires to display a sub message only in the vicinity of the fixed magnifications of the first embodiment. Hence, since the sub messages are not displayed unless a magnification becomes close to the fixed magnifications, an unskilled operator may fail to understand in what manner the magnification is to be set with a display deleted. To deal with this, in the second embodiment, during zooming up or down for the purpose of setting a desired magnification, sub messages corresponding to various fixed magnifications in a condition of zooming up from an initial magnification are displayed altogether.

For example, referring to the fixed magnifications for the A- and the B-sizes, when an initial magnification prior to zooming up or down is 85%, by operating the zoom up key 103, various sub messages for the fixed magnifications of 85% or higher are displayed. In other words, the fixed magnifications exceeding 85% are 86%, 115%, 112 &, 141%, and therefore, sub messages consisting of combinations of the original and the paper sizes at the fixed magnifications under optimal conditions are displayed altogether. Referring to such displays, an operator can easily set the desired magnification.

Now, controlling for realizing the operation above will be described with reference to the control flow in FIG. 11.

Figure 11:
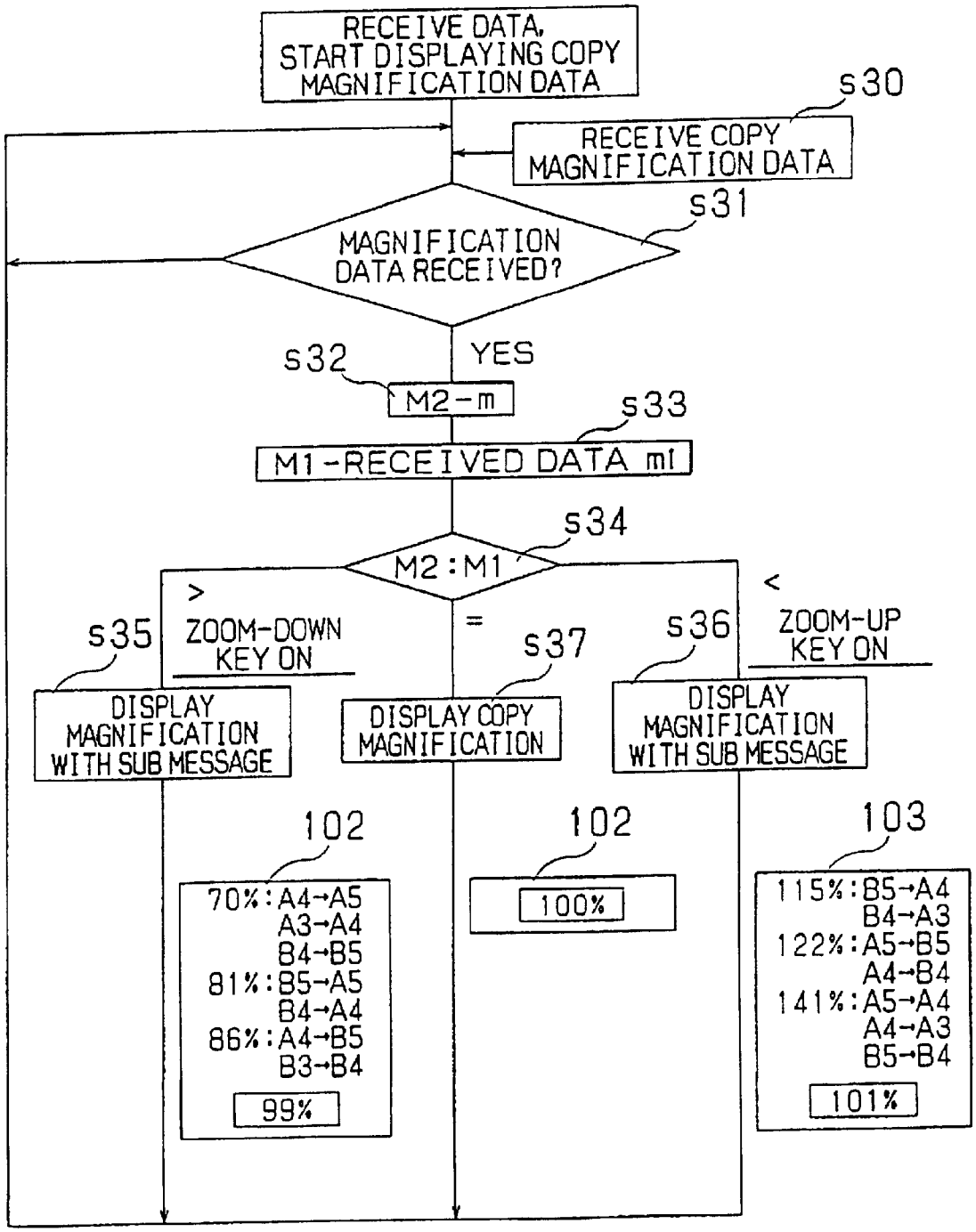
FIG. 11 is a control flow chart for displaying a sub message together with a set magnification according to a second embodiment of the invention.

Before executing the control flow shown in FIG. 11, in the control flow shown in FIG. 7 or 8, the zoom up key 103 or the zoom down key 104 is operated.

Confirming this operation, the control flow shown in FIG. 7 or 8 is carried out, and at the step S6 (or S06), a set magnification which is equal to an initial magnification as it is increased by "1" is transferred to the operation panel control portion 128. Upon reception of the magnification data thus transferred at the operation panel control portion 128, the control flow in FIG. 11 is executed on the operation panel control portion 128 side, by the CPU 143 in particular.

Hence, when reception of the magnification data is confirmed (S30), the received data being the magnification data is recognized (S31), the initial magnification (m) set before the zoom up key 103 or the zoom down key 104 is operated is stored in a memory portion M2, and the new set magnification which is transferred (m1) is stored in a memory portion M1 (S32, S33). The initial set magnification (m) is stored in the memory portion M1 under a regular circumstance, and the contents of the memory portion M1 are transferred and stored to the memory portion M2. The transferred new set magnification (m1) is the count contents of the magnification counter M which are set by operating the zoom up key 103 or the zoom down key 104 in FIG. 7 or 8.

At the next step, the contents the memory portions M1 and M2 are compared with each other (S34). When the transferred magnification (m1) in the memory portion M1 is larger than the magnification (m) in the memory portion M2, it is confirmed that the current condition is the zoom up condition by means of the zoom up key 103. On the other hand, when the magnification in the memory portion M1 is smaller than the magnification in the memory portion M2, it is confirmed that the current condition is the zoom down condition by means of the zoom down key 104.

Where the memory contents in the respective memory portions are in a relationship M2 (m)>M1 (m1), the sequence proceeds to a step S35, whereby together with the set magnification and the various fixed magnifications of the zoom down side, the LCD 102 displays a sub message indicating a combination of original and paper sizes under an optimal condition. When M2<M1, the sequence proceeds to a step S36, whereby together with the set magnification and the various fixed magnifications of the zoom up side, the LCD 102 displays a sub message indicating a combination of original and paper sizes under an optimal condition, as shown in the drawing.

During such displaying described above, reference to sub messages for the various fixed magnifications which are displayed together makes it easy for an operator to set a desired magnification. In FIG. 10, when the magnification data are transferred from the main CPU 124 to the operation panel control portion 128 without operating the zoom up key 103 or the zoom down key 104, regarding at the step S34 that the set magnification is the same, the magnification which is set, e.g., the magnification data "100%" for the initial value, is displayed (S37).

The sub messages are displayed only during a predetermined period of time after the operation but may thereafter be erased to leave the set magnification alone as displayed. The predetermined period of time is such a time which allows an operator to recognize a displayed sub message, e.g., around five seconds. Further, as a combination with the first embodiment, when the set magnification becomes a fixed magnification or a value close to a fixed magnification, erased sub messages may be displayed altogether during the predetermined period of time. In this case, as in the first embodiment, only a combination of the original and the paper size under an optimal condition in the vicinity of the fixed magnifications may be displayed, or the combination and the set magnification may be displayed together. Hence, since when the set magnification becomes close to the fixed magnifications, the sub messages are displayed again. Thus, an operator can recognize the desired magnification again, setting the desired magnification without any mistake in an easy manner with an even more simpler operation.

In FIG. 11, although the foregoing has described that sub messages are erased after the predetermined period of time when the various fixed magnifications of the zoom up or down direction and the sub messages are to be displayed while the zoom up key 103 or the zoom down key 104 is operated, the sub messages may be always displayed including the various fixed magnifications and when one of the fixed magnifications which are displayed together is passed, a sub message for the fixed magnification which is passed may be erased while the sub messages corresponding to the remaining fixed magnifications may be displayed. Thus, since an unwanted condition is erased, the desired magnification can be more easily recognized and the desired magnification can be set more surely.

Figure 12:
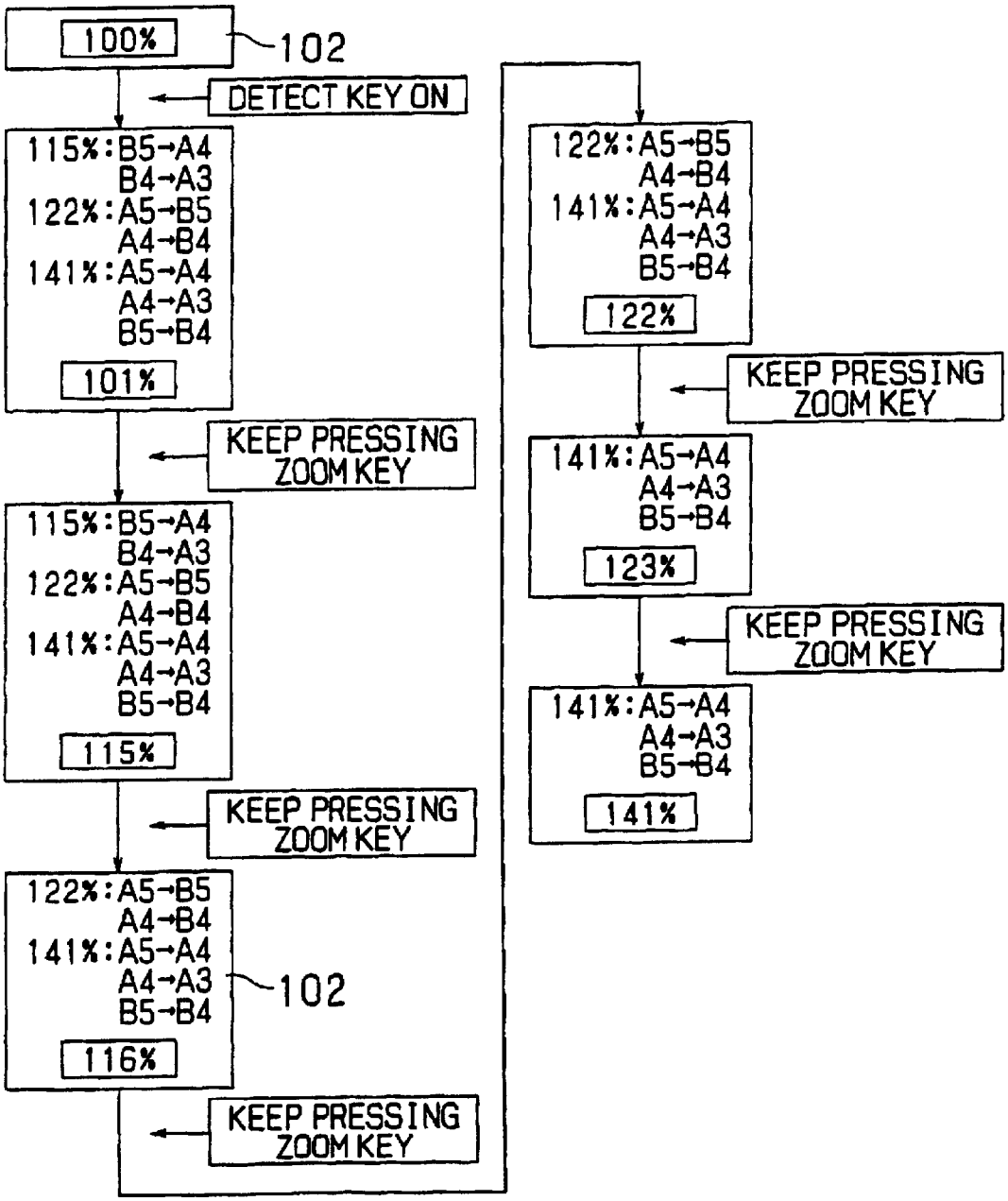
FIG. 12 is a view showing an example of a display form for displaying a change in magnification and a sub message according to the second embodiment of the invention.

That is, when the LCD 102 is in the condition of displaying as shown in FIG. 12, as the zoom up key 103 is operated starting from an initial value of 100% (equal magnification) for instance, in the condition that this operation is continuing (ON maintained), initially, a sub message is displayed which indicates a combination of the original and the paper sizes under an optimal condition for the fixed magnifications of 115%, 122%, 141%. This display condition is maintained up to 115%, and when the set magnification reaches 116% after passing the fixed magnification of 115%, the sub message corresponding to the fixed magnification of 115% is erased.

Further, by continuously operating the zoom up key 103, until the set magnification reaches the fixed magnification of 122%, the fixed magnification of the zoom up direction and a corresponding sub message are displayed together. As the set magnification reaches 123%, only a sub message corresponding to the remaining fixed magnification of 141% is displayed. As described above, every time a fixed magnification is passed, the fixed magnification which is not necessary any more and a corresponding sub message are erased, and therefore, the labor of visually recognizing is reduced, the operability is improved, and setting of a desired magnification is simplified without fail.

Although the foregoing has described the zoom up direction, the fixed magnifications of the zoom down direction and corresponding sub messages together are displayed. Every time a displayed fixed magnification is passed, the displayed fixed magnification and a corresponding sub message are erased.

FIG. 12 describes an example where every time a fixed magnification is passed, the fixed magnification which is passed is erased. Unlike this, in a condition that fixed magnifications and sub messages are displayed together, rather than erasing the fixed magnification which is passed, the fixed magnification which will appear next and the other fixed magnifications are displayed in different conditions from each other. This makes it easier to set a desired magnification and attains the object of making it possible to easily recognize that the desired magnification has been already passed.

Figure 13:
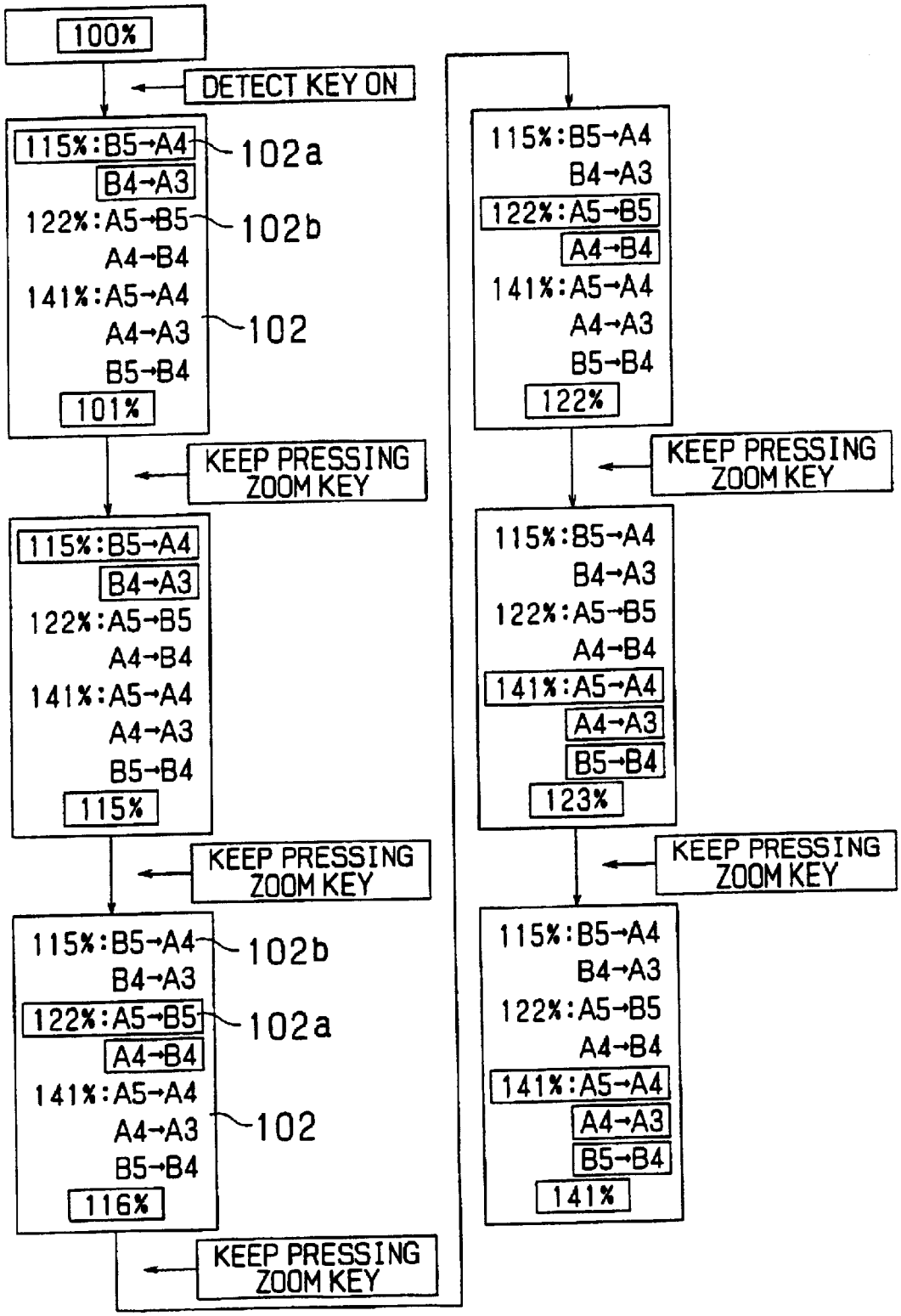
FIG. 13 is a view showing an example of a display form for displaying a change in magnification and a sub message according to the second embodiment of the invention.

FIG. 13 shows the above-described example of displays. In FIG. 13, when the set magnification is initially 100% (equal magnification) as in FIG. 12, operating the zoom up key 103 zooms up the set magnification as the magnification of 101%. In this condition, the LCD 102 displays the various fixed magnifications of the zoom up direction starting from 100% and corresponding sub messages all at once. At this stage, a display 102*a* of a sub message corresponding to the next fixed magnification of 115% is displayed distinctively from a display 102*b* of a sub message for the fixed magnifications of 122% and 141%.

When the set magnification reaches 116%, the next fixed magnification of 122% alone is displayed distinctively from the other fixed magnifications. When the set magnification reaches 123% at last, the fixed magnification of 141% is displayed distinctively from the other fixed magnifications.

Out of the various fixed magnifications which are displayed together, the next fixed magnification which follows the set magnification which is currently displayed by the display portion is displayed in reverse in the drawing, distinctively from the displays of the other fixed magnifications. This makes it possible to easily recognize the next fixed magnification and to set the desired magnification. Further, since it is possible to easily recognize relationships between the display condition of the set magnification and the fixed magnifications, judgment of whether the desired set magnification is passed is made easy. In the case that the desired set magnification is not passed, that operation is continued, whereby it is possible to set the desired set magnification without fail. When the condition that the desired magnification is passed is confirmed, the zoom down key 104 is operated separately from the zoom up key 103 so that the desired magnification is set in an easy manner. At this stage, since the fixed magnifications of the zoom down direction are displayed all at once and the initial fixed magnification is displayed distinctively from the other fixed magnifications, setting of a magnification in the vicinity of that is extremely easy.

The foregoing has described that the operations with the zoom up key 103. The operations with the zoom down key 104 are similar, and therefore, will not be described.

To distinctively display, besides displaying in reverse colors, the colors may be changed, larger characters may be used to display, a mark such as "→" may be placed at the beginning of a display, etc. As described earlier, for the purpose of displaying in reverse colors, the attribute RAM 144 is used. The color pallet 149 or the like is used for changing the colors. When the colors are changed, naturally, the LCD 102 is a color image display apparatus.

In another embodiment, as displays including fixed magnifications of sub messages, an area for such display is restricted in accordance with a mode to which the copying machine 1 is set. For instance, in the copying machine shown in FIG. 4, the CCD reads an image and a digital image read in this manner is processed in accordance with a magnification, and therefore, scan reading is performed always at a constant reading speed regardless of the set magnification.

However, when the image of the original as that shown in FIG. 5 is focused directly on the photosensitive material 32, it is necessary to control a scanning speed of the optical system in accordance with the set magnification. Where an original is mounted on the original seater 21 and an image of the original is scanned by the optical system 27 and exposed on the photosensitive material 32, it is possible to optically scan at a set speed, thereby solving a problem such as a change in the speed. However, when reflected light from an original is to be focused on the photosensitive material 32 through the optical system 27 while transporting the original in the RDH 22 or the like, the range of an allowable magnification is narrower than in the case where an original on the original seater 21 is scanned. For instance, where a magnification which allows the optical system 27 to scan is 64%–141%, when an image is to be focused on the photosensitive material 32 while transporting an original, the range is limited to around 70%–121%. This is for ensuring that an image focused on the photosensitive material 32 accurately.

Hence, in the case that the mode for forming an image by means of the RDH 22 is selected, fixed magnifications within the range above and sub messages are displayed together. This case is as shown in FIG. 14.

Figure 14:
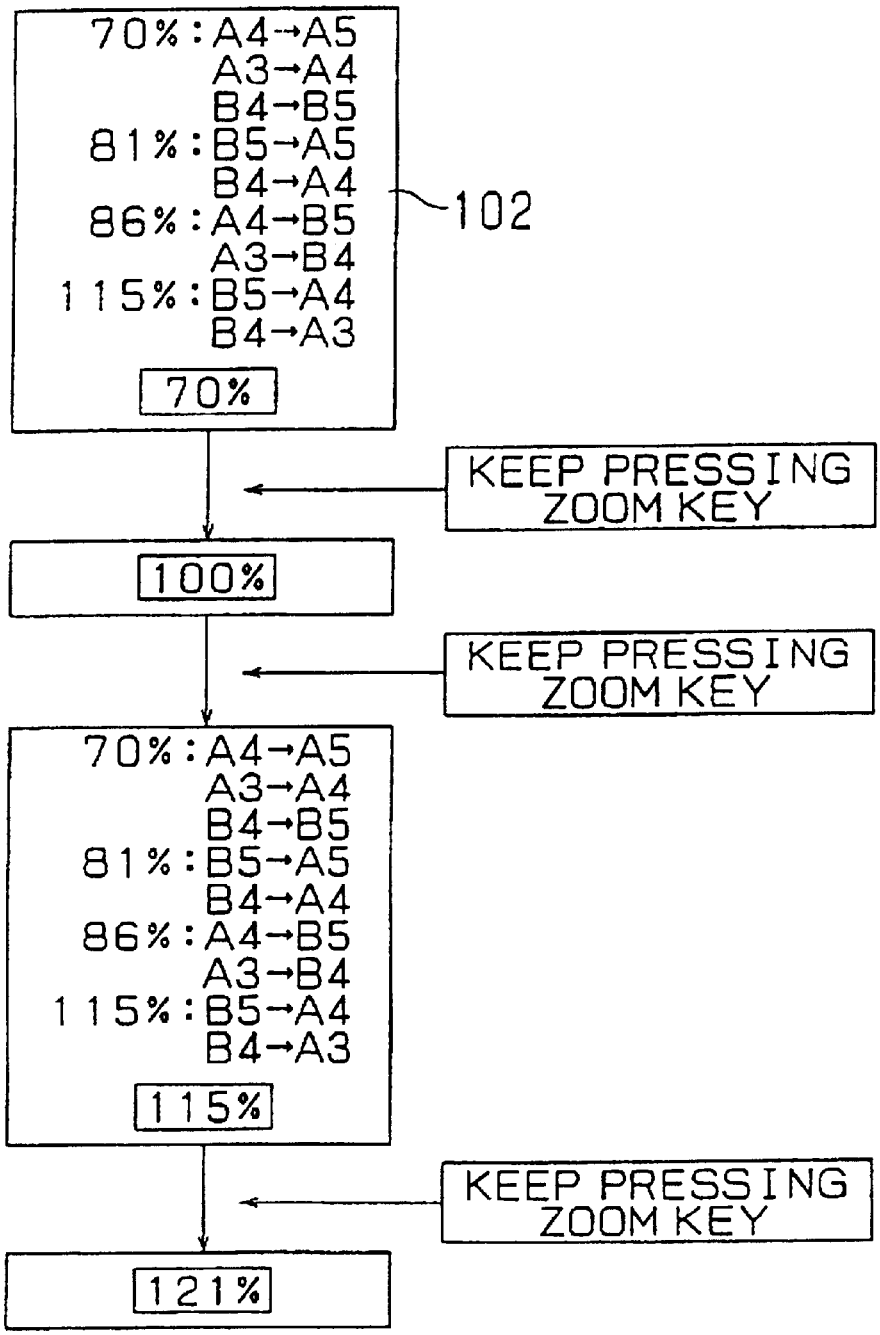
FIG. 14 is a view showing an example of a display form for displaying a change in magnification and a sub message according to the second embodiment of the invention.

In FIG. 14, where the initial value is 69%, as the zoom up key 103 is operated, together with the set magnification of 70% and fixed magnifications along the zoom up direction of 70%, 81%, 86%, 115%, sub messages under an optimal condition with original and paper sizes of that time point are displayed. As the zoom up key 103 is further continuously operated, the magnification is gradually zoomed up, shifting from 71%, 72% . . . 100%, and the sub messages are erased upon arrival at 100%. Further, sub messages are erased as the fixed magnification of 15% is passed, zooming up is performed up to the magnification of 121%, and further zooming up is prohibited.

Normally, in the mode for copying with an original left still on the original seater 21 unlike in the RDH mode, besides the fixed magnifications above, fixed magnifications of 122% and 141% as well are displayed together with corresponding sub messages. In the RDH mode, no such displaying is provided for the fixed magnifications of 122% and 141% which are outside the range. Thus, as far as displaying of sub messages is concerned, relative relationships between original and paper sizes which are allowed for the respective modes are displayed as sub messages, and hence, it is possible for an operator to set a fixed magnification within the allowable range or to set an optional magnification in an easy manner without fail.

Other mode with a set magnification range determined as the RDH mode is an 1-set/2-copy mode wherein an original is set still on the original seater 21 and an image on the left-hand side and an image on the right-hand side of the set original are copied onto separately papers. This is utilized when a book original is set as it is opened on the original seater 21 and an image on a left-hand side page and an image on a right-hand side page are copied onto separately papers or on the both sides of one sheet paper. Due to this, magnifications which are allowed are in the range of 64%–100% (when the allowable set magnifications in the copying machine are in the range of 64%–141%), which prohibits enlargement copy. Even in such a mode, the various fixed magnifications which are within the range above are displayed with sub messages.

In this embodiment as well, the entire copying machine, original sizes, a selected paper size, a paper size for which paper feeding is possible may be displayed together with sub messages as shown in FIG. 10, which is needless to mention.

<Third Embodiment>

Now, a third embodiment, i.e., an embodiment for more simplifying displaying of sub messages and setting a desired magnification more surely and easily than in the first and the second embodiments, will be described.

That is, in sub messages, optimal conditions for combinations of usable original sizes and usable paper sizes are displayed. Hence, the larger the number of the originals and the papers which are usable, the larger the number of the combinations, which requires wide visual confirmation and causes a mistake. To deal with this, in the case that an original size is set in advance, a usable paper size of a magnification for the original is specified and displayed. In this manner, the contents of a sub message are specified, whereby the magnification is set easily without fail.

Further, in the case that not only an original size is specified, i.e., set, but also a paper size is selected, it is possible to specify an original size, in particular, corresponding to a fixed magnification. In addition, a paper which can be fed only has to be specified, even though a paper size is not specified, to specify an original size which corresponds to that size.

<Case Where Original Size Is Set>

First, a case where an original size for copying is specified will be described. The following cases are considered as the case where an original size is specified. A case where an original size of an original which is mounted on the original seater is automatically sensed by a detection sensor and the original size is recognized upon each sensing. A case where an operator knows an original size and inputs the original size by a ten-key 108. Moreover, since an original is mounted in advance in the RDH or the like, automatic detection of the size of the mounted original by the detection sensor is known. A case where the detected size is automatically set as an original size is also included.

An automatic sensing apparatus for sensing the size of an original which is mounted on the original seater 21 has been already known prior to the application of the invention, and those introduced in official gazettes which describe a known technique and those which are in public use will not be described here. Further, as described earlier, in the RDH 22 or ADF for automatically transporting an original, the size of an original which is mounted on the original tray 22*a* or the like is automatically detected in advance.

Figure 15:
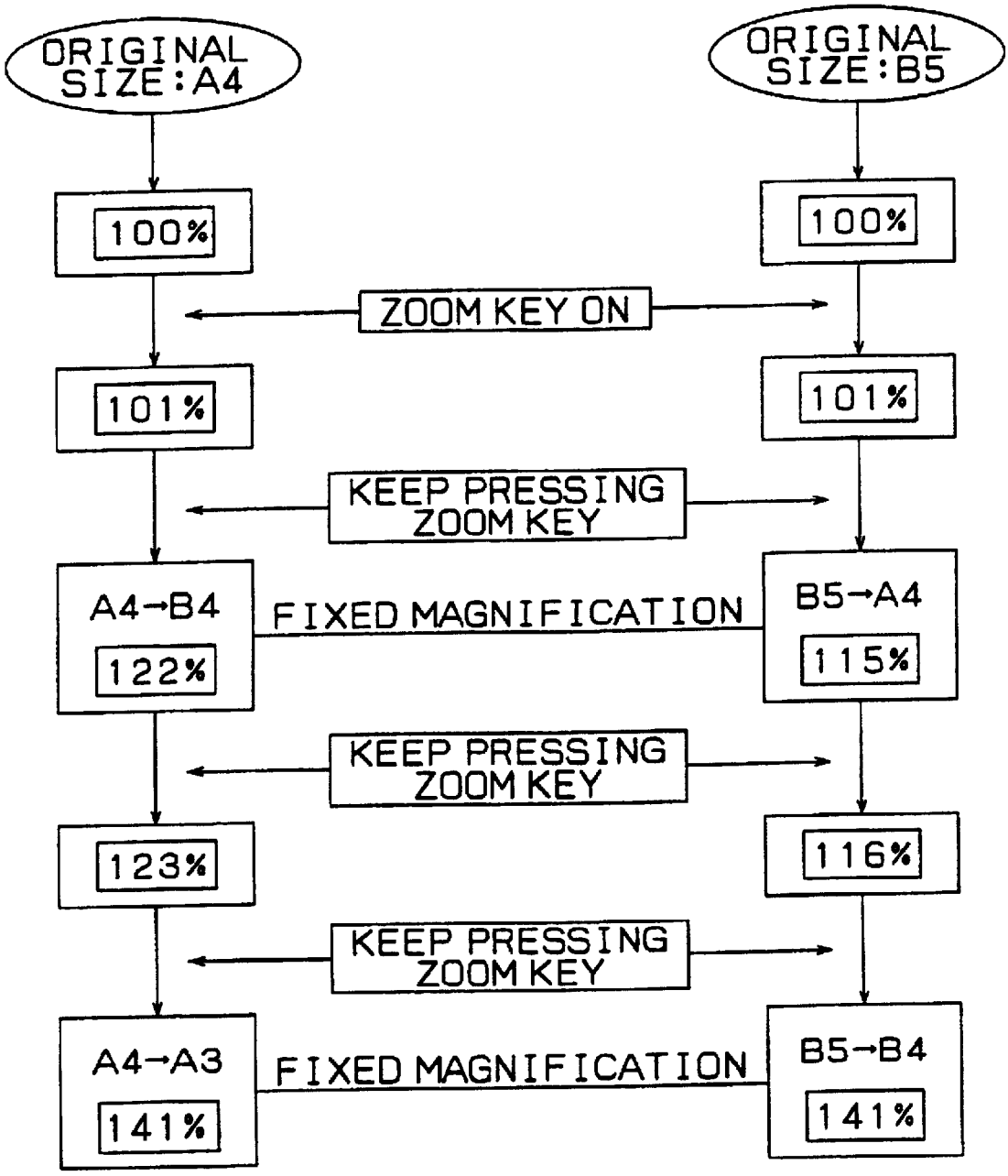
FIG. 15 is a view showing an example of a display wherein an original size is set in a display example where a change in magnification and a sub message are displayed, for the purpose of describing a third embodiment of the invention.

Once an original size for copying is specified and set in the manner described above, a sub message is displayed which corresponds to the detected original size as shown in FIG. 15. For instance, when the original size is set as A4, as the initial value of 100% is zoomed up by means of the zoom up key 103, a sub message regarding the initial fixed magnification of 115% is not displayed but a sub message is displayed when the fixed magnification of 122% is reached. This sub message indicates a combination of an optimal paper size which can used for copying with the original size of A4 at the fixed magnification of 122%, i.e., "A4→B4."

Further, as the zoom up key 103 is further continuously operated, when the fixed magnification of 141% is reached, a sub message is displayed which indicates a combination of "A4→A3." With the original size of A4, when the zoom down key 104 is operated, a sub message for the fixed magnification of 81%, in particular, is not displayed. For the fixed magnification of 86%, "A4→B5" is displayed as a sub message, while "A4→A5" is displayed as a sub message for the fixed magnification of 70%.

The foregoing has described that by means of operating the zoom up key 103 or the zoom down key 104, sub messages are displayed in accordance with the fixed magnifications. However, this is to display sub messages together with fixed magnifications with ±5% as in the first embodiment.

Further, according to the second embodiment, the various fixed magnifications of the zoom up or down direction may be displayed together with sub messages all at once. In this case, with the initial value of 100%, in response to an operation of the zoom up key 103, together with the fixed magnifications of 122% and 141%, in accordance with these fixed magnifications, sub messages "A4→B4" and "A4→A3" are displayed all at once. On the other hand, in response to an operation of the zoom down key 104, with the initial value of 100%, together with the fixed magnifications of 86% and 70%, in accordance with these fixed magnifications, sub messages "A4→B5" and "A4→A5" are displayed all at once.

In this manner, by displaying the fixed magnifications and the sub messages in accordance with the set original size, a desired magnification can be easily recognized and set. Since a paper size allowing copying with the set original size is specified, even though understanding of a desired magnification fails, the desired magnification can be easily recognized by referring to the displayed sub messages. In this case, the displayed sub messages serve as minimum necessary information which permits easy recognition.

FIG. 15 shows an example of a display in the case of B5, not only A4, as the set original size. In short, when the set original size is B5, fixed magnifications are 115% and 141% in the zoom up direction as shown in the drawing but 81% is the only fixed magnification in the zoom down direction as shown in FIG. 6. As the original size is set in this manner, a paper size is specified. Therefore, a sub message corresponding to fixed magnifications from an original size to a plurality of paper sizes, which is automatically selected from sub messages including all combinations of a plurality of original sizes and a plurality of paper sizes, is displayed. Accordingly the operator easily grasp a desired magnification.

Since the set original size (or image size) is fed to the CPU 143 of the operation panel control portion 128 from the main CPU 124, on the CPU 143 side, a combination for a sub message can be specified as described earlier.

The set original size is displayed as shown in FIG. 10, so that the selected paper size (A4) can be compared with a paper size which is combined with the original size which is displayed in the sub message, thereby making it even easier to select a paper size and set the magnification.

<Case Where Paper Size Is Set>

The foregoing has described displaying of fixed magnifications and corresponding sub messages in a condition where an original size is set and zooming up or down is performed. In a similar manner, it is possible to provide a narrowed-down display with a fixed magnification and a paper size narrowed down, in accordance with a paper size which is set.

Setting of a paper size is manually inputting a desired paper size through the ten-key 108 by an operator. That is, an operator selects a desired paper size. In accordance with a paper size which is selected, a sub message showing this paper size and a corresponding original size under an optimal condition is displayed together with a fixed magnification.

A paper size is selected by means of the paper selection key 114 of the operation panel 101 which is shown in FIG. 2. In short, by operating the paper selection key 114, one of the paper feed cassettes in the paper feed unit 4 is selected, and papers inside the paper feed cassette are fed. At this stage, the paper size of the papers contained (set) in the paper feed cassette is detected by known size detection means, and the paper size is displayed in a specified area on the LCD 102 upon selection of the paper feed cassette.

FIG. 15 shows an example where the paper size is selected in the manner above, with reference to which a detailed description will be given. First, when an operator selects A4 as a paper size for forming an image, with the initial magnification of 100%, the zoom up key 103 is operated.

In response to this, the magnification is zoomed up by 1% each time, as 101% . . . 115%. As the magnification increases, when the fixed magnification of 115% is reached, a sub message "B5→A4" is displayed with the fixed magnification. As the zoom up key 103 is further continuously operated, since the next fixed magnification of 122% is a different magnification condition which is different from the desired paper size of B5, a sub message is not displayed. When the fixed magnification of 141% is reached, a sub message "A5→A4" is displayed with the fixed magnification.

The paper size is selected in this manner. In the case of A4, for instance, a sub message for the fixed magnification of 122% is not displayed.

Conversely to such zooming up, in the zoom down direction, as can be seen in FIG. 6, a sub message for the fixed magnification of 86% is not displayed but a sub message "B4→A4" for the fixed magnification of 81% and a sub message "A3→A4" for the fixed magnification of 70% are displayed.

Figure 16:
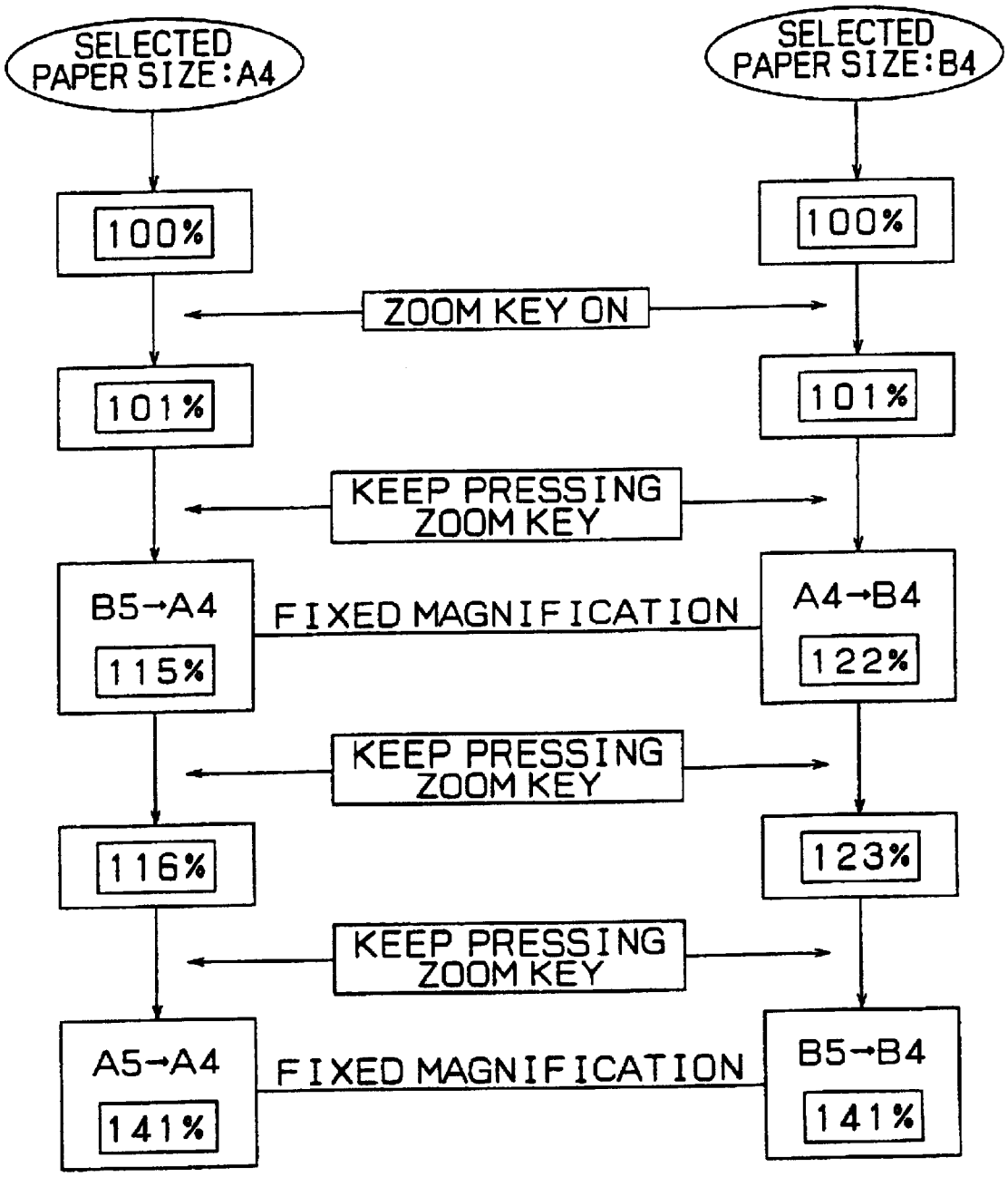
FIG. 16 is a view showing an example of a display wherein a paper size, in particular, is selected in a display example where a change in magnification and a sub message are displayed, for the purpose of describing the third embodiment of the invention.

Regarding a case where the selected paper size is B4, as shown in FIG. 16, in the zoom up direction, sub messages "A4→B4" and "B5→B4" corresponding to the fixed magnifications of 122% and 141% are displayed. Further, in the zoom down direction, in the example of the displayed fixed magnifications and sub messages in FIG. 6, only "A3→B4" for the fixed magnification of 86% is displayed.

In this case, in the first embodiment, similarly to setting of an original size, in ±5% around the fixed magnifications, the fixed magnifications and corresponding sub messages are displayed.

Meanwhile, in the second embodiment, after an operation of the key 103 or 104 in the zoom up or down direction is confirmed, sub messages are displayed which are combinations of fixed magnifications and original sizes under optimal conditions for a globally selected paper size. For instance, when A4 is selected as a paper size and the initial magnification is 100%, together with the fixed magnifications of 115% and 141%, sub messages "B5→A4" and "A5→A4" corresponding to these fixed magnifications are displayed together in accordance with the fixed magnifications. In the zoom down direction, together with the fixed magnifications of 81% and 70%, sub messages "B4→A4" and "A3→A4" corresponding to these fixed magnifications are displayed together.

In the case where an image size is set and the paper size is selected in this manner as well, the fixed magnifications and the original sizes are narrowed down, so that a desired magnification can be more easily recognized. Hence, an operator can easily set not only the desired fixed magnification but also an optional magnification.

During selection of the paper size, when papers of the size which is selected by an operator are not set to the copying machine main unit 1, displaying of fixed magnifications and sub messages may be in vain. That is, when papers of a selected size are not set to the copying machine 1, the copying machine 1 can not automatically select and feed those papers so that copying is impossible. Hence, displaying described above is performed in a condition where those papers are selected after the existence of those papers of the selected size is confirmed.

To this end as well, the paper sizes which are set to the paper feed portions are sequentially detected as conventionally known, and the detected paper size is transferred to the main CPU 124. The main CPU 124 thereafter grasps the paper size which is set and selectively drives the paper feed cassette of the paper feed unit which agrees with the selected paper size based on an instruction for feeding papers. Hence, the papers of the selected size are not set, that condition is reported to an operator in order to encourage the operator to set desired papers. For this purpose, an operation of the copying machine 1 is stopped until the papers of the selected size are set.

Hence, when the operator sets the papers of the selected size, such displaying as above is performed, so that an operation of setting a magnification during such displaying is simplified. With respect to papers of the paper feed portion which is set, the existence of these papers is detected. When there are no papers as well, a message asking to supply papers of that size is reported to the operator. Thus, when there are not papers of a selected size, that condition is fed to the operation panel control portion 128, and the CPU 143 provides a display which requests the operator to supply or set papers. In the case that the operator proceeds to set a magnification without complying with the request, a sub message or the like as that described in relation to the first or the second embodiment may be given regardless of selected papers.

<Case Where Feedable Papers Are Not Specified>

On the other hand, even when an operator, without selecting a paper size, looks at a combination of an original size which corresponds to a paper size of feedable papers which are set to the copying machine 1 and fixed magnifications, a magnification can be set easily. In short, the copy machine 1, particularly the main CPU 124, has paper size detection means (not shown) detect the paper size of papers which are set to each paper feed unit as described above, receives a size signal and grasps papers of which size are feedable from a paper feeder cassette of the paper feed unit.

In this case, regarding a paper feed portion which corresponds to each paper feeder cassette of the paper feed unit 4, the main CPU 124 knows not only the paper size of papers which are feedable from the paper feed portion but also a condition of a paper feed portion which can not feed papers because of a malfunction of paper feed rollers, a jammed paper, etc. A condition that paper feed is impossible includes a condition that feeding of papers is impossible with papers not set in a paper feed cassette as described above, in addition to a trouble due to a paper feed error at a paper feed portion and the like.

Hence, the paper size of feedable papers is transferred from the main CPU 124 to the operation panel control portion 128 so that combinations or the like of original sizes and fixed magnifications are displayed. This example is shown in FIG. 17.

Figure 17:
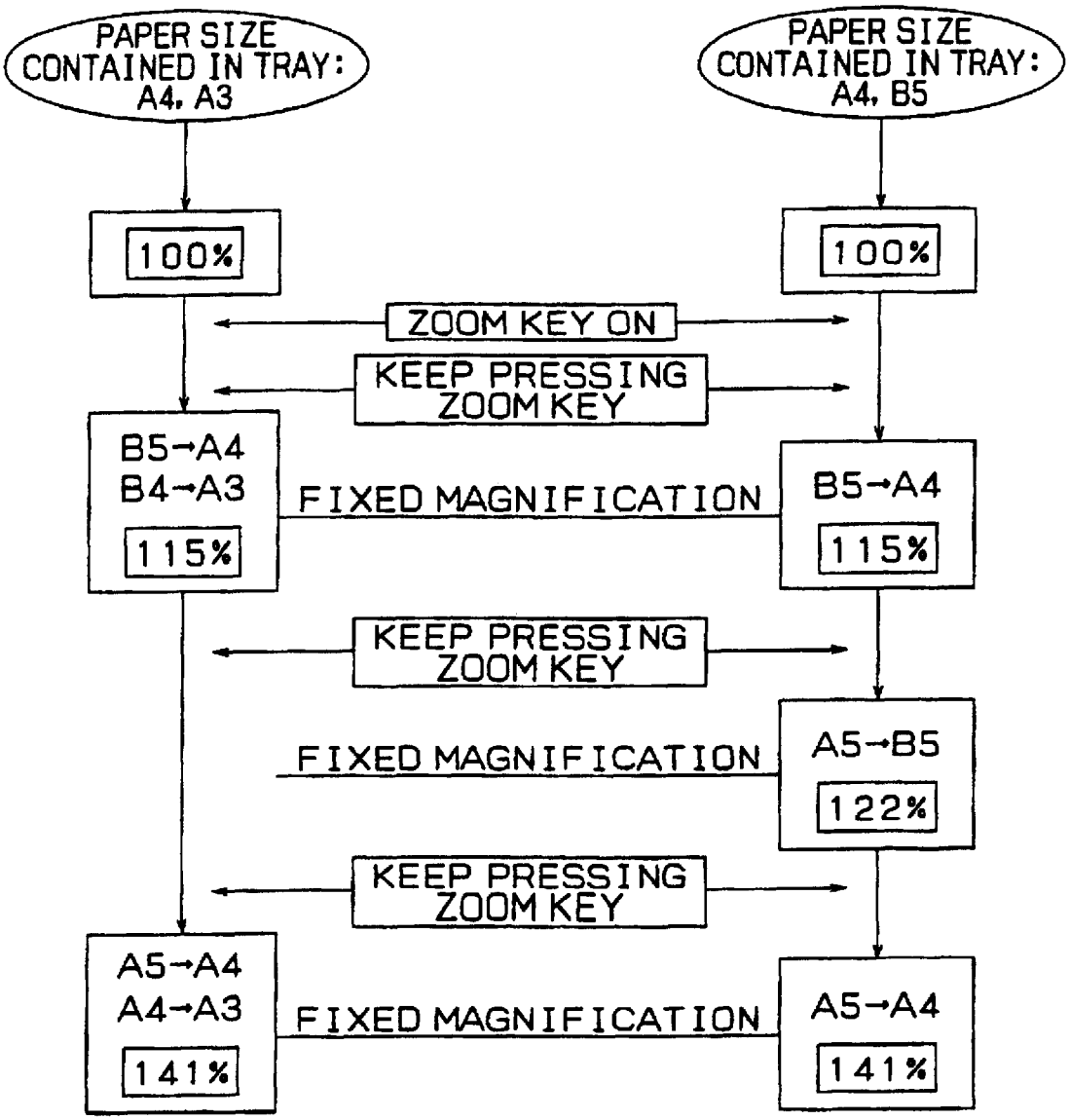
FIG. 17 is a view showing an example of a display of a sub message which related to a paper size of papers which are feedable, in a display example where a change in magnification and a sub message are displayed, for the purpose of describing the third embodiment of the invention.

In FIG. 17, it is assumed that the paper sizes of feedable papers are A4 and A3, for example. With the initial magnification of 100%, as the zoom up key 103 is operated, the magnification is zoomed up by 1% each time, as 101%, 102%, . . . When the fixed magnification of 115% is reached, combinations of original sizes which are appropriate to the paper size with this fixed magnification are displayed as sub messages. In this example of the display, "B5→A4" and "B4→A3" are the sub messages. As the zoom up key 103 is further operated, the magnification is further gradually zoomed up. When the next fixed magnification of 122% is reached, since there is no fixed original size which is appropriate to the paper sizes of feedable papers are A3 and A4, fixed magnifications nor sub messages are displayed.

When the fixed magnification of 141% is reached, combinations or the paper sizes of A3, A4 and the original sizes A4, A5 which are appropriate to the fixed magnifications, i.e., "A5→A4" and "A4→A3" are displayed as sub messages.

Meanwhile, in the case where the paper sizes of feedable papers are A4 and B5, in a similar manner, upon arrival at the magnification of 115%, in accordance with a fixed magnification at that time, a combination of the original size B5 and the paper size A4, i.e., a sub message "B5→A4" is displayed. When the next fixed magnification of 122% is reached, a combination of the original size A5 and the paper size B5, i.e., a sub message "A5→B5" is displayed. Upon arrival at the magnification of 141%, a combination of the original size A5 and the paper size A5, i.e., a sub message "A5→A4" is displayed.

Although not shown, in the zoom down direction staring from the initial magnification of 100%, in a similar manner to above, in the case where the paper sizes of feedable papers are A4 and A3, since fixed magnifications are 81% and 70% as can be seen in FIG. 6, sub messages including combinations "B4→A4" and "A3→A4" are displayed in accordance with these fixed magnifications. Meanwhile, in the case where the paper sizes of feedable papers are A4 and B5, as can be seen in FIG. 6, a sub message "A4→B5" is displayed for the fixed magnification of 86%, a sub message "B4→A4" is displayed for the fixed magnification of 81%, and sub messages of combinations of "B4→B5" and "A3→A4" are displayed for the fixed magnification of 70%.

According to the first embodiment, sub messages of combinations of original and paper sizes are displayed with fixed magnifications in the range of ±5%. According to the second embodiment, sub messages which readily correspond to the various fixed magnifications of the zoom up or down direction are displayed all at once.

When sub messages are displayed all at once which are combinations of fixed magnifications and paper sizes as described above as the third embodiment, erasing of fixed magnifications which are passed in the zoom up or down direction may be combined with distinguishing of the next fixed magnification and the other fixed magnifications. This further narrows down combinations for sub messages, and hence, makes setting of a magnification even more accurate and easy.

<Change In Magnification Shift Cycle>

Now, as described in relation to the first embodiment, during setting of a magnification and zooming up or down, when the magnification is changed very quickly, a mistake may occur during setting of the magnification. A description will be given on an actual example for slowing down shifting of the magnification in the vicinity of fixed magnifications to deal with this.

In this case, a shifting of the magnification is slowed down in the vicinity of a fixed magnification, it is possible to accurately set the magnification. On the other hand, since a change in the magnification becomes slow around when the magnification passes a fixed magnification, an operation time for setting the magnification becomes longer. Therefore, in the vicinity of fixed magnifications, during an operation of the zoom up key 103 or the zoom down key 104, only when the magnification is in the process of passing a fixed magnification, a change in the magnification is quickened rather than slowing down, and as the magnification becomes close to the next fixed magnification, a change in the magnification is slowed down again. This shortens a time which is necessary for setting a magnification as much as possible.

Figure 18:
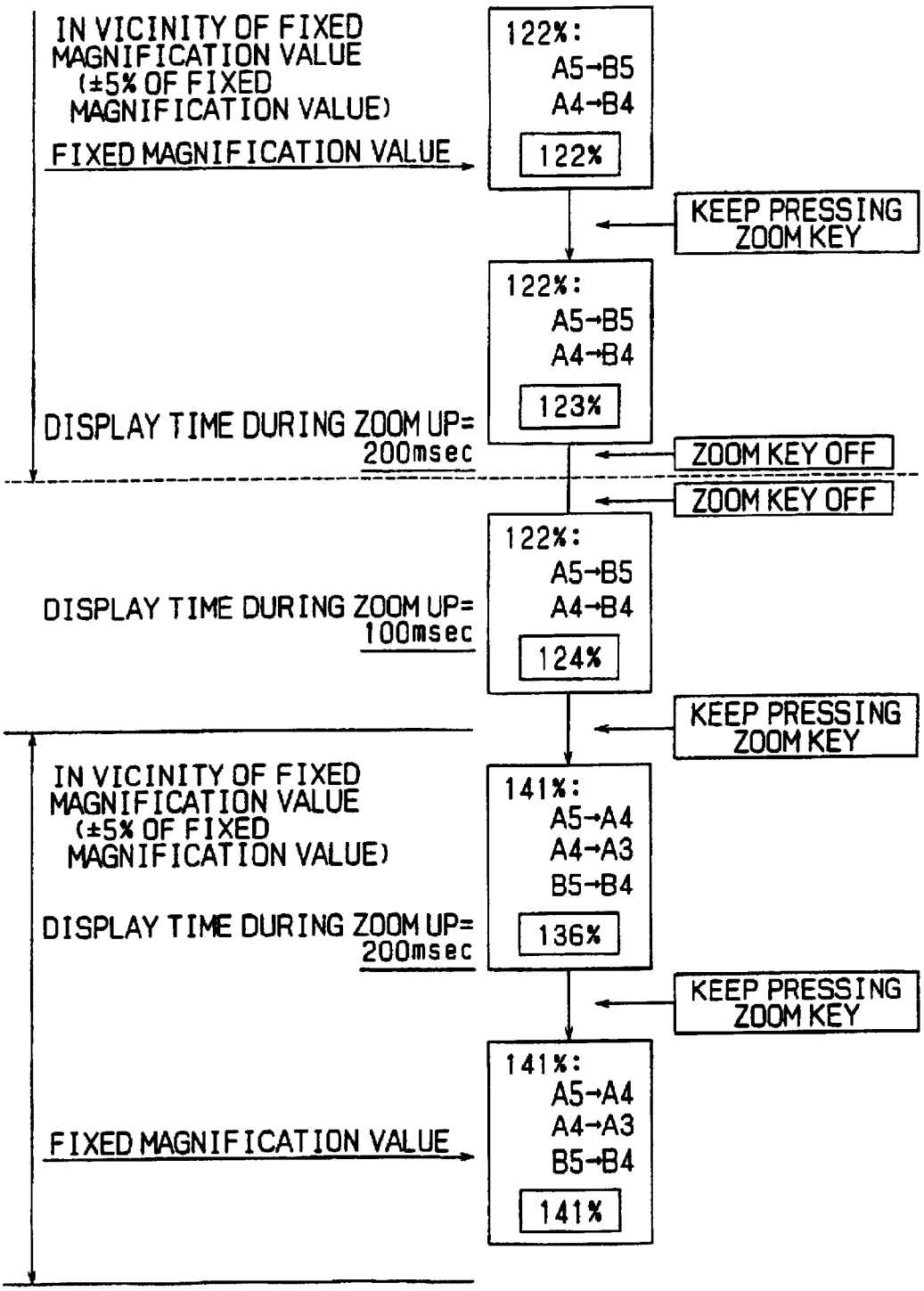
FIG. 18 is a view showing a condition for changing a cycle at which a magnification is changed when a relationship between the magnification and a sub message, in particular, is displayed, for the purpose of describing the third embodiment of the invention.

FIG. 18 shows an example where an operation of the zoom up key 103, for instance, is released (OFF) once during shifting around the fixed magnification of 122% but is resumed to set a desired magnification. This is an example where the magnification is changed every 100 msec. In the vicinity of the fixed magnification of 122%, the magnification is changed every 200 msec.

For instance, when an operation of the zoom up key 103 is released with a magnification of 123% but is resumed at this magnification, in normal cases, since the magnification is in the vicinity of the fixed magnification of 122%, the magnification is changed every 200 msec. When the zoom up key 103 is operated with the magnification already passed the fixed magnification of 122%, the magnification is changed every 100 msec rather than every 200 msec which corresponds to this fixed magnification.

The operation of the zoom up key 103 is continued, and when the magnification becomes close to the next fixed magnification of 141%, the magnification is changed every 200 msec. For instance, the cycle of shifting from a magnification of 136% is slowed down, switching from 100 msec to 200 msec. This shortens a time which is necessary for setting a desired magnification since the change in the magnification is not slowed down in the vicinity of the fixed magnifications which were passed during zooming up.

Thus, a change in the magnification is slowed down as the magnification becomes close to fixed magnifications so as to simplify setting of the magnification as described earlier. Slowing down a change in the magnification as the magnification becomes close to fixed magnifications in this manner creates a great effect in the second embodiment where fixed magnifications are displayed all at once. In FIG. 18, in the case that the operation of the zoom up key 103 is released with a magnification of 123% once but is resumed, for setting the magnification near 123%, the zoom up key 103 in intermittently operated. That is, to set to 125%, when the zoom up key 103 is intermittently operated twice, a desired magnification is set in a short period of time without any problem.

Further, when there are fixed magnifications which are very frequently used, a change in the magnification may be further slowed down in the vicinity of the fixed magnifications which are very frequently used. For instance, when the fixed magnification of 122% is very frequently used, while the magnification is changed normally every 200 msec in the vicinity of the fixed magnifications, the magnification is set to change every 400 msec. Magnifications which are very frequently used are not limited to fixed magnifications but may be optional magnifications.

FIG. 19 shows a control flow in the operation panel control portion 128. When the zoom up key 103 is operated, in accordance with the count contents of the magnification counter, whether the frequency of use of the indicated magnification is high is confirmed at S42. Prior to this, an operation condition of the zoom up key 103 or the zoom down key 104 is sensed at S40, the contents of the magnification counter are incremented or decremented by "1" at step S41. In the case that the frequency of use of the magnification which is counted by the magnification counter M being high is confirmed at S42, as a time every which the magnification changes, 400 msec is set to the timer T (S43). In the case that the frequency is not high, whether the magnification counter has the contents in the vicinity of the fixed magnifications is confirmed (S44). When the magnification count is in the vicinity of the fixed magnifications, the time every which the magnification changes is set 200 msec (S45). When the magnification count is confirmed not to be in the vicinity of the fixed magnifications, the time every which the magnification changes is set 100 msec (S46).

Figure 20:
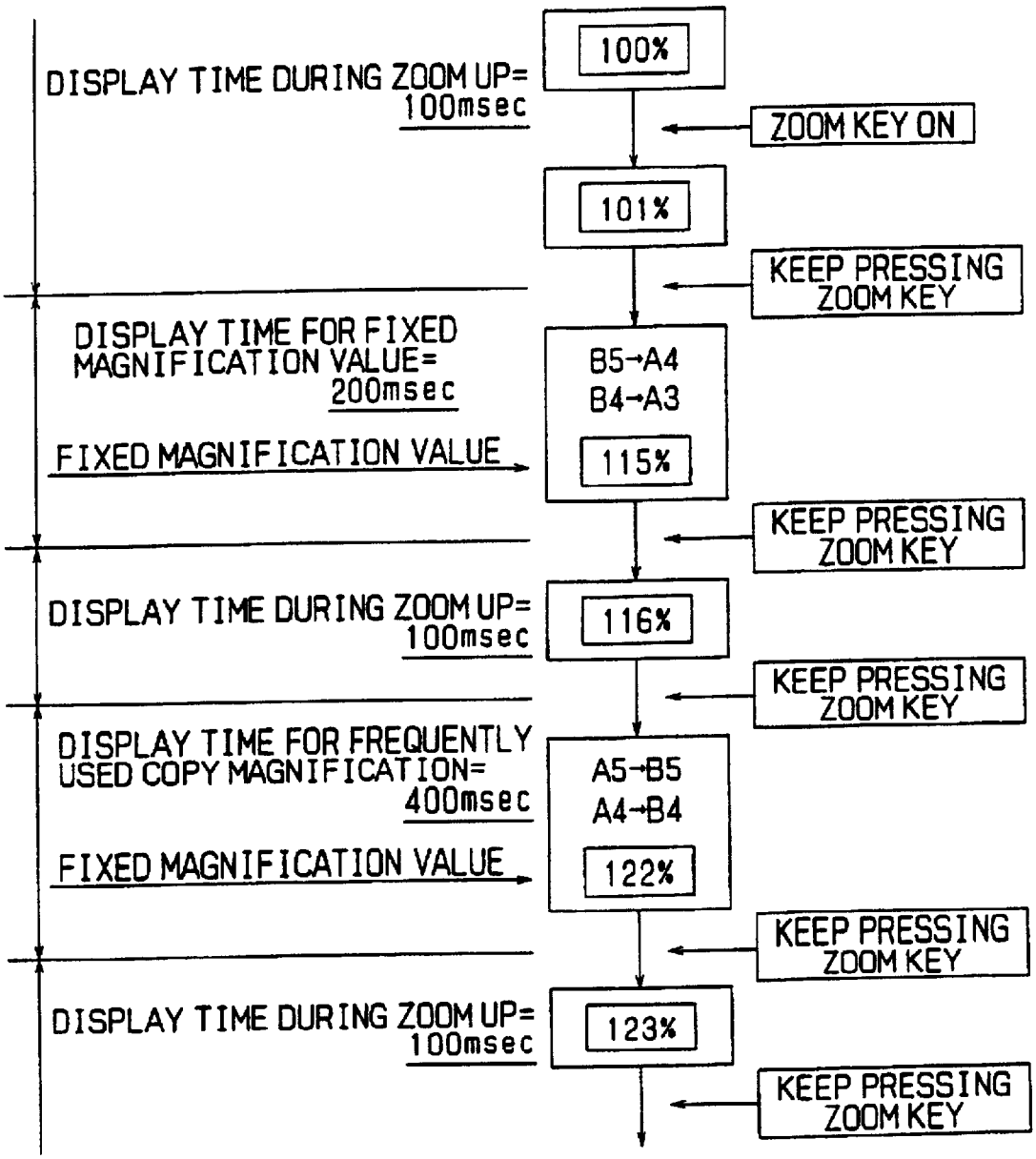
FIG. 20 is a view showing an example of a display of change in magnification in setting a magnification.

FIG. 20 shows a changing condition of a display which is displayed by the LCD 102 in the control flow as described above. In the drawing, a magnification having a very high frequency of use is shown as the fixed magnification of 122%. With the initial magnification of 100%, as the zoom up key 103 is operated, the magnification is shifted as 101%, 102% . . . During the process, since the magnification is not fixed magnifications or magnifications having a high frequency of use, the magnification shifts at a cycle of 100 msec. In the vicinity of the first fixed magnification of 115%, the magnification shifts at a cycle of 200 msec. Once the magnification passes 115% and reaches 116%, the magnification thereafter shifts at a cycle of 100 msec. As the magnification becomes close to 122%, the magnification shifts at a cycle of 400 msec. Once the magnification reaches 123%, the magnification shifts at a cycle of 100 msec.

In this manner, since the magnification shifts slower in the vicinity of a magnification having a high frequency of use, particularly in the precedent condition alone, it is possible to set a magnification having a high frequency of use easily and to set a magnification around such a magnification easily.

Regarding whether the frequency of use is high, when the respective magnifications are set, the number of copying with the set magnification is counted and the frequency of use is judged as high in the case that the count exceeds "100."

Figure 19A:
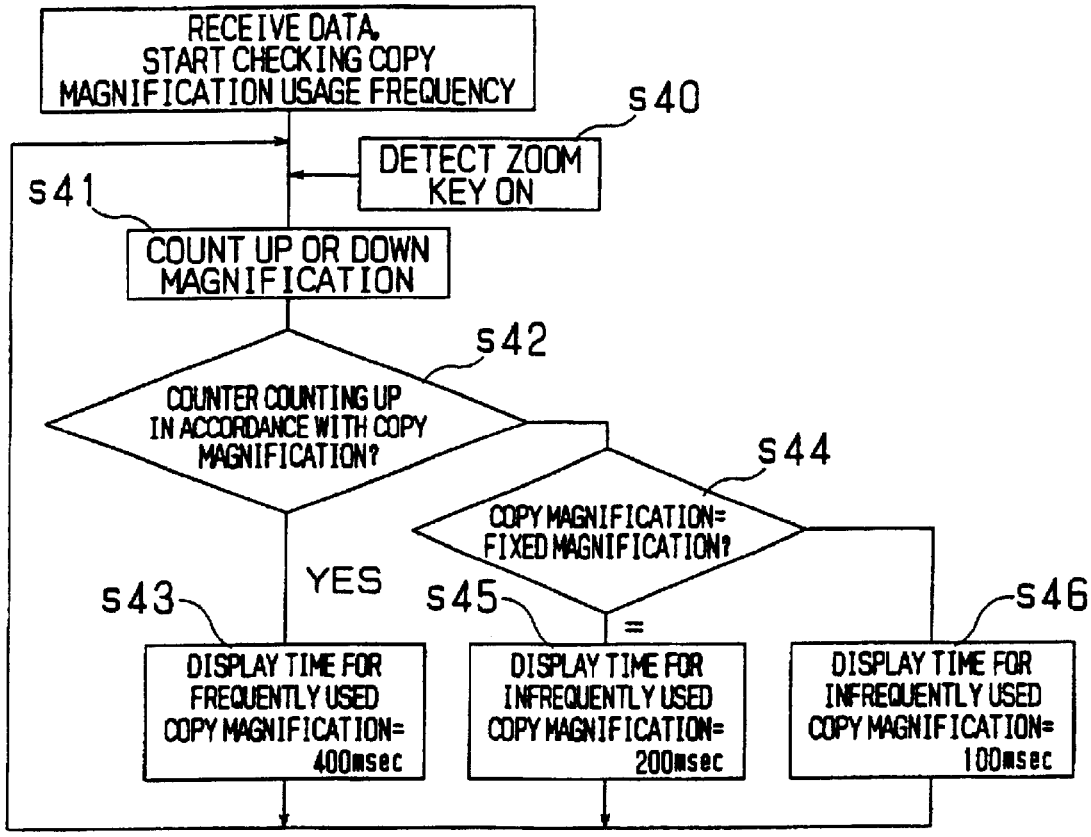
FIGS. 19A and 19B are views for describing the third embodiment of the invention, FIG. 19A being a flow chart showing controlling in which a cycle for changing a magnification is extended longer for a fixed magnification and a magnification having a high frequency of use when a relationship between the magnification and a sub message is displayed, FIG. 19B being a control flow chart showing an example for setting a condition where the frequency of use is high.
Figure 19B:
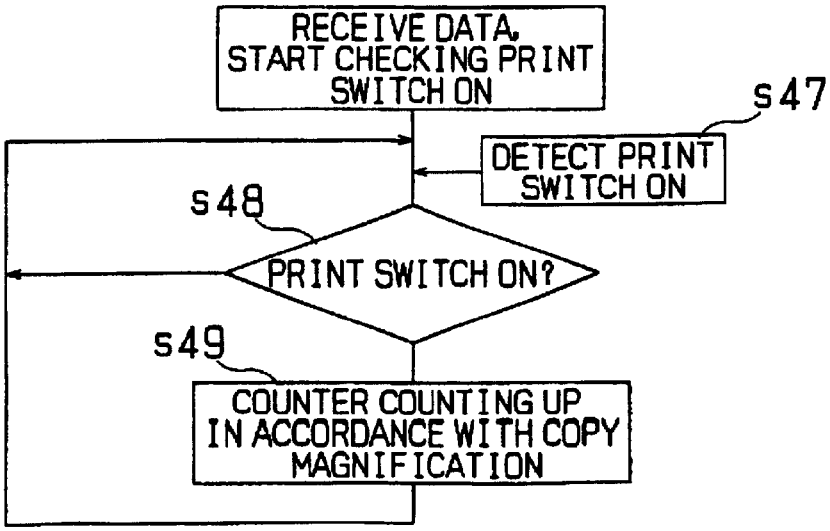

To this end, as shown in FIG. 19B, when the print switch is operated (S47→S48) at a magnification which is set, the counter corresponding to the magnification is incremented by "1" (S49). That is, every time the print switch is operated, the contents of the counters which are disposed in correspondence to the respective magnifications are gradually counted up. With the content exceeding a predetermined count, the content of the counter corresponding to the magnification which is set at the step S42 of FIG. 19A is checked, and the frequency of use is judged as high in the case that the content exceeds the predetermined count.

When a magnification having a high frequency of use is limited to a fixed magnification, counters which are disposed in correspondence to the respective magnifications may be disposed. To confirm a condition that an optional magnification has a high frequency of use, according to this embodiment, for instance, counters corresponding to the respective magnifications between 64% and 141% are provided.

A predetermined value, i.e., a counter of a counter, for judging the frequency of use only has to be optionally set. A user may register magnifications having high frequencies of use in advance and whether a set magnification is a registered magnification which is registered in this manner may be judged at the step S42 and used as a magnification having a high frequency of use. These registered magnifications are not limited to fixed magnifications but may be optionally set, and an optional number of registered magnifications may be set. While FIG. 19A show fixed magnifications as magnifications which have higher frequencies of use than optional magnifications except for the magnifications having high frequencies of use described above, the fixed magnifications are not limited to this. Such magnifications which have the next level of higher frequencies of use can be appropriately determined by a user.

While the condition that the magnification is still changing when set as described above is not limited to the first embodiment, but rather, can be implemented in the second embodiment as well. In short, when a set magnification reaches a fixed magnification or a magnification having a high frequency of use, shifting of the magnification is merely changed.

<Fourth Embodiment>

Now, other embodiment for setting a magnification by zooming up or down will be described in the following. In this embodiment, setting is performed while primarily referring to a fixed magnification. More precisely, when the zoom up key 103 or the zoom down key 104 is operated, as a desired magnification is passed, a reverse zoom key must be operated. In this case, when the operation of the zoom key is released within a predetermined period of time since a fixed magnification is displayed, the display is automatically returned to the fixed magnification.

That is, when the zoom up key 103 or the zoom down key 104 is operated to thereby perform zooming up or down successively, as a desired magnification is passed, the display is returned to the fixed magnification which is passed so that setting of a fixed magnification is simplified.

As herein termed, being successive refers to a condition where operating a key once shifts a magnification by 2% or more. A key operation which changes a magnification by 1% at a time is not referred to as being successive, to permit setting of a magnification in the unit of 1%.

First, when an operation of the zoom up key 103 or the zoom down key 104 is confirmed, the control flow shown in FIG. 7 or 8 is carried out, whereby from an initial magnification, e.g., 100%, the magnification counter M is counted up or down by "1" each time. Describing in accordance with the control flow shown in FIG. 7 for simplicity of description, in a condition that the zoom up key 103 is operated, this key operation is detected (S0) and confirmed (S1), the magnification counter M is thereafter counted up by "1" (S5), and the content of the magnification counter M is transferred to the operation panel control portion 128. Before returning to the step S1, whether the zoom up key 103 is continuously operated is checked (S0). In the case where checking performed here finds that the operation of the zoom up key 103 is released (OFF), the magnification is changed by 1%. This processing will be described later.

On the other hand, when the zoom up key 103 is continuously operated, the magnification counter M is counted up by "1" once again. This is processed as a successive key operation. On the operation panel control portion 128 side, the magnification is displayed through the LCD 102 as shown in FIG. 1.

When the magnification becomes close to the first fixed magnification of 115% which is near 100%, e.g., enters the range of ±5%, a sub message is displayed together with this fixed magnification as described in relation to the first embodiment. In this condition, with the fixed magnification of 115% displayed, during the process of setting a magnification, the magnification passes 115%, and when 120% is reached, the zoom up key 103 is released. At this stage, releasing pressing down of the zoom up key 103 within a predetermined period of time, particularly in a time which is necessary until the magnification passes by about +5%, returns the display to the fixed magnification of 115%. In this case, the magnification counter M as well is changed to the content expressing the fixed magnification of 115%.

This is to return to the condition of a fixed magnification which is passed when the zoom up key 103 is in a condition to successively change for the purpose of setting the magnification. However, as described above, when the key operation is released after performing conversion, e.g., zooming up of 1% by means of the zoom up key 103, a changing condition to change by 1% is maintained.

Figure 21:
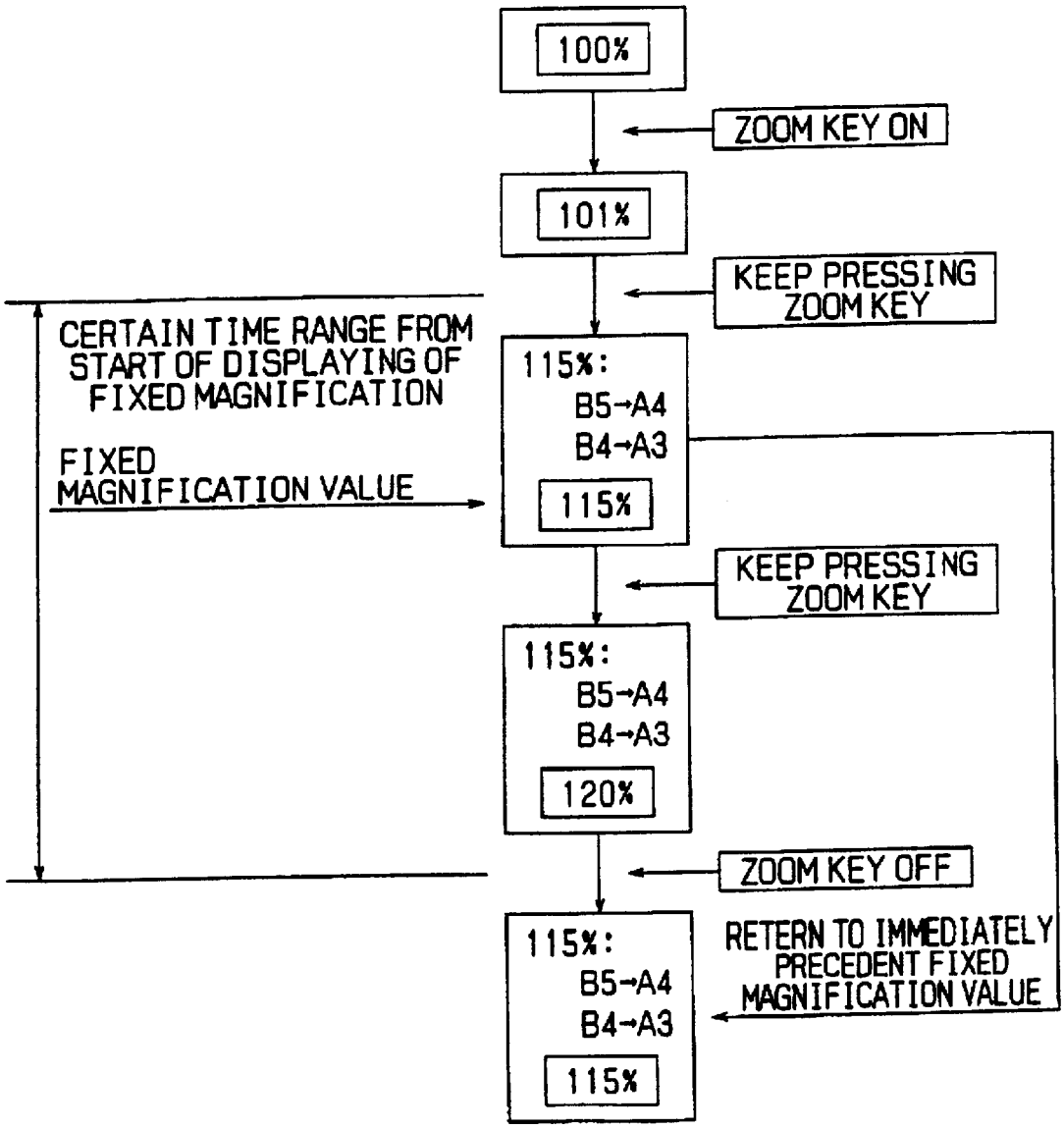
FIG. 21 is a view showing an example of a display of returning to an immediately precedent fixed magnification condition when a fixed magnification is passed in particular, in a display example where a change in magnification and a sub message are displayed, for the purpose of describing a fourth embodiment of the invention.

FIG. 21 shows an example of a display which is shifted during setting of a magnification described above. Referring to this example, the details of this embodiment will be described. In FIG. 21, the initial magnification is 100% but the magnification is shifted by 1% each time as 101%, 102% . . . and as the zoom up key 103 is operated. In the vicinity of the fixed magnification of 115% which first appears in the zoom up direction, a sub message and the fixed magnification of 115% are displayed together. As the magnification changes to 120%, when a fact that the desired magnification of 115% is passed, the operation of the zoom up key 103 is released (OFF). At this stage, regarding that successive changing is performed by means of the zoom up key 103, the display is returned to the immediately precedent magnification of 115% which is prior to the condition of 120%.

Hence, during the process in which an operator successively changes the magnification, even though setting of a desired magnification is passed, when the operator notices this and releases the operation within a predetermined period of time, particularly in a time which is needed for change the magnification by around 5% of a fixed magnification, it is possible to return to the desired fixed magnification. This further simplifies setting of a fixed magnification.

When the desired magnification is not a fixed magnification but is a magnification close to a fixed magnification, such as 118%, after returning to the fixed magnification of 115% above, the zoom up key 103 is operated intermittently by 1% to set an optional magnification which is not a fixed magnification in an easy manner. The intermittent operation here is to operate the zoom up key 103 and thereafter release (OFF) the operation of the zoom up key 103 upon zooming up by 1% in a repeated manner. Hence, operating the zoom up key 103 intermittently three times (repeating ON/OFF three times) easily sets the magnification of 118%.

In the embodiment above, setting of a fixed magnification is even simper and very easy. It is possible to set an optional magnification easily by intermittently operating the zoom up key 103 or the like.

Although the respective embodiments above are related to setting of a magnification within the copying machine as that shown in FIGS. 4 and 5, application to a printer rather than such a copying machine is similarly possible. That is, to print image data which are sent to a printer on a paper at an optional magnification, it is necessary to set the optional magnification in advance. For setting of such a magnification, setting of a magnification described above is readily used. For instance, when the size of image data is a fixed size as that shown in FIG. 6, a sub message which corresponds to a paper size which is in accordance with this size is displayed so that petting of a magnification is performed based on the display.

What is claimed is:

1. A magnification setting apparatus of an image forming apparatus in which a plurality of fixed magnifications at which a plurality of predetermined image sizes are enlarged or reduced into a plurality of sizes of recording mediums are predetermined and which forms an image on a recording medium at the predetermined magnifications, the magnification setting apparatus comprising:

a zoom key for setting a magnification by shifting by a predetermined unit;

a magnification counter for serially counting the magnification in accordance with an operation of the zoom key;

a display portion for displaying a magnification which is a count content of the magnification counter;

judging means for judging whether the count content of the magnification counter corresponds to a predetermined fixed magnification; and display control means for displaying, together with the predetermined fixed magnification, sub messages which indicate combination of paper sizes which correspond to the predetermined fixed magnification, when the judging means judges that the magnification shown by the magnification counter corresponds to the predetermined fixed magnification, wherein the judging means judges a time when the content of the magnification counter reaches a value which is close to the predetermined fixed magnification.

2. The magnification setting apparatus of an image forming apparatus of claim 1, wherein the magnification counter includes a controller for elongating a cycle of counting a magnification by the zoom key when the magnification which is set by operating the zoom key arrives at a fixed magnification or at a magnification close thereto.

3. A magnification setting apparatus of an image forming apparatus in which a plurality of fixed magnifications at which a plurality of predetermined image sizes are enlarged or reduced into a plurality of sizes of recording mediums are predetermined and which forms an image on a recording medium at the predetermined magnifications, the magnification setting apparatus comprising:

a zoom key for setting a magnification by shifting by a predetermined unit;

a magnification counter for serially counting the magnification in accordance with an operation of the zoom key;

a display portion for displaying a count content of the magnification counter; and display control means for displaying sub messages which indicate combinations of paper sizes corresponding to each predetermined fixed magnification at once together with the predetermined fixed magnifications, when the zoom key is operated, wherein the magnification counter includes a controller for elongating a cycle of counting a magnification by the zoom key when the magnification which is set by operating the zoom key arrives at a fixed magnification or at a magnification close thereto.

4. A magnification setting apparatus of an image forming apparatus of claim 3, wherein the display control means includes judging means for judging in which one of a magnification zooming up direction and a magnification zooming down direction the zoom key is operated, and allows various predetermined fixed magnifications in the zooming up direction or the zooming down direction to be displayed.

5. A magnification setting apparatus of an image forming apparatus of claim 4, wherein when the magnification which is set by operating the zoom key has exceeded a fixed magnification, (a) a display of the exceeded fixed magnification is deleted, or (b) fixed magnifications to which a magnification set by operating the zoom key will be sequentially set, and the remaining fixed magnifications are displayed distinguishably from each other.

6. A magnification setting apparatus of an image forming apparatus of claim 1, 3 or 4, the magnification setting apparatus further comprising:

image size setting means for setting one image size among a plurality of image sizes, wherein, when the changing count content arrives at a fixed magnification of the magnification counter from an image size set by the image size setting means to a paper size, the display control means allows a sub message which indicates a combination of an image size and a paper size corresponding to the fixed magnification, to be displayed.

7. The magnification setting apparatus of an image forming apparatus of claim 1, 3 or 4, the magnification setting apparatus further comprising:

image size setting means for setting one image size among a plurality of image sizes; and paper size selection means for selecting a plurality of paper sizes, wherein when the changing count content arrives at a fixed magnification at which enlargement or reduction form an image size set by the image size setting means to a paper size selected by the paper size selection means is carried out, the display control means allows a sub message which indicates combinations of image sizes and paper sizes corresponding to the fixed magnification, to be displayed.

8. A magnification setting apparatus of an image forming apparatus in which a plurality of fixed magnifications at which a plurality of predetermined image sizes are enlarged or reduced into a plurality of sizes of recording mediums are predetermined and which forms an image on a recording medium at the predetermined magnifications, the magnification setting apparatus comprising:

a zoom key for setting a magnification by shifting by a predetermined unit;

a magnification counter for serially counting the magnification in accordance with an operation of the zoom key;

a display portion for displaying a count content of the magnification counter;

judging means for judging whether the count content of the magnification counter corresponds to a predetermined fixed magnification; and display control means for displaying a sub message which indicates combinations of paper sizes corresponding to the predetermined fixed magnification, together with the fixed magnification in the display portion, and as well for returning contents of display to ones for a precedent fixed magnification upon release of an operation of the zoom key within a predetermined period since arrival of the set magnification at the predetermined fixed magnification, when the judging means judges that the content of the set magnification of the magnification counter corresponds to the predetermined fixed magnification.

9. The magnification setting apparatus of an image forming apparatus of claim 8, wherein when the zoom key is operated and a magnification is successively shifted by the predetermined unit, the display control means returns contents of display to ones for an immediately precedent fixed magnification, and when the magnification is intermittently shifted by the predetermined unit by means of the zoom key, the display control means maintains the condition of the set magnification without returning to the predetermined fixed magnification.

10. The magnification setting apparatus of an image forming apparatus in which a plurality of fixed magnifications at which a plurality of predetermined image sizes are enlarged or reduced into a plurality of sizes of recording mediums are predetermined and which forms an image on a recording medium at the predetermined magnifications, the magnification setting apparatus comprising:

a zoom key for setting a magnification by shifting by a predetermined unit;

a magnification counter for serially counting the magnification in accordance with an operation of the zoom key;

a display portion for displaying a count content of the magnification counter; and display control means for displaying sub messages which indicate combinations of paper sizes corresponding to each predetermined fixed magnification at once together with the predetermined fixed magnifications, when the zoom key is operated, wherein the display control means includes judging means for judging in which one of a magnification zooming up direction and a magnification zooming down direction the zoom key is operated, and displays various predetermined fixed magnifications in accordance with the zooming up direction or the zooming down direction judged by the judging means.

11. A magnification setting apparatus of an image forming apparatus in which a plurality of fixed magnifications at which a plurality of predetermined image sizes are enlarged or reduced into a plurality of sizes of recording mediums are predetermined and which forms an image on a recording medium at the predetermined magnifications, the magnification setting apparatus comprising:

a zoom key for setting a magnification by shifting by a predetermined unit;

a magnification counter for serially counting the magnification in accordance with an operation of the zoom key;

a display portion for displaying a magnification which is a count content of the magnification counter;

judging means for judging whether the count content of the magnification counter corresponds to a predetermined fixed magnification; and display control means for displaying, together with the predetermined fixed magnification, sub messages which indicate combination of paper sized which correspond to the predetermined fixed magnification, when the judging means judges that the magnification shown by the magnification counter corresponds to the predetermined fixed magnification, wherein the magnification counter includes a controller for elongating a cycle of counting a magnification by the zoom key when the magnification which is set by operating the zoom key arrives at a fixed magnification or at a magnification close thereto.

*12. A magnification setting apparatus for an image forming apparatus in which a plurality of predetermined fixed magnifications at which a plurality of predetermined image sizes of originals are enlarged or reduced into a plurality of sizes of recording mediums are predetermined and which forms an image on a recording medium at the predetermined magnifications, the magnification setting apparatus comprising:*

*a zoom key for setting a magnification by increasing or decreasing by a predetermined unit;*

*a display portion for displaying a magnification set by the zoom key;*

*judging means for judging whether the zoom key is operated in either a magnification zooming up direction or a magnification zooming down direction; and*

*display control means, responsive to an output from the judging means, for controlling the display portion to*

*display a message meaning equal magnification in the display portion, when the magnification is set at 100% by operating the zoom key, and to*

*display sub messages that indicate combinations of paper sizes corresponding to each predetermined fixed magnification in the zooming up direction simultaneously with the predetermined fixed magnifications, when the magnification is increased by operating the zoom key in the zooming up direction relative to the magnification by 100%.*

*13. The magnification setting apparatus of claim 12, wherein the display control means, responsive to an output from the judging means, controls the display portion to display sub messages that indicate combinations of paper sizes corresponding to each predetermined fixed magnification in the zooming down direction simultaneously with the predetermined fixed magnifications, when the magnification is decreased by operating the zoom key in the zooming down direction relative to the magnification of 100%.*

*14. The magnification setting apparatus of claims 12 or 13, wherein, when the magnification is set to 100% by operating the zoom key, the display control means controls the display portion so that all of the predetermined fixed magnifications and sub messages that are being simultaneously displayed are erased, and so that the message meaning equal magnification is displayed.*

*15. The magnification setting apparatus of claims 12 or 13, wherein, when the magnification corresponds to one of the predetermined fixed magnifications by operating the zoom key, the display control means controls the display portion so as to distinguish the corresponding predetermined fixed magnification from the other fixed magnifications.*

*16. The magnification setting apparatus of claim 15, wherein the display control means controls the display portion so as to distinguish the corresponding predetermined fixed magnification from the other fixed magnifications by a reversed color or by changing a color.*

*17. The magnification setting apparatus of claim 12,*

*wherein the zoom key further includes a zooming down key and a zooming up key, and*

*wherein the judging means judges whether the zooming down key or zooming up key is operated.*

*18. A magnification setting apparatus for an image forming apparatus in which a plurality of predetermined fixed magnifications at which a plurality of predetermined image sizes of originals are enlarged or reduced into a plurality of sizes of recording mediums are predetermined and which forms an image on a recording medium at the predetermined magnifications, the magnification setting apparatus comprising:*

*a zoom key for setting a magnification by increasing or decreasing by a predetermined unit;*

*a display portion for displaying a magnification set by the zoom key;*

*judging means for judging whether the zoom key is operated in either a magnification zooming up direction or a magnification zooming down direction; and*

*display control means, responsive to an output from the judging means, for controlling the display portion to*

*display a message meaning equal magnification in the display portion, when the magnification is set at 100% by operating the zoom key, and to*

*display sub messages that indicate combinations of paper sizes corresponding to each predetermined fixed magnification in the zooming down direction simultaneously with the predetermined fixed magnifications, when the magnification is decreased by operating the zoom key in the zooming down direction relative to the magnification of 100%.*

* * * * *